(12) United States Patent
Dubruel et al.

(10) Patent No.: US 11,098,155 B2
(45) Date of Patent: *Aug. 24, 2021

(54) URETHANE BASED MATERIALS, DERIVATIVES, METHODS OF THEIR PREPARATION AND USES

(71) Applicants: Universiteit Gent, Ghent (BE); Allnex Beligum SA, Drogenbos (BE)

(72) Inventors: Peter Dubruel, Ghent (BE); Sandra Van Vlierberghe, Ghent (BE); Annemie Houben, Ghent (BE); Hugues Van Den Bergen, Drogenbos (BE); Patrice Roose, St-Pieters-Leeuw (BE); Dirk Bontinck, Ertvelde (BE)

(73) Assignee: UNIVERSITEIT GENT, Ghent (BE)

( * ) Notice: Subject to any disclaimer, the term of this patent is extended or adjusted under 35 U.S.C. 154(b) by 0 days.

This patent is subject to a terminal disclaimer.

(21) Appl. No.: 16/751,752

(22) Filed: Jan. 24, 2020

(65) Prior Publication Data

US 2020/0157274 A1  May 21, 2020

Related U.S. Application Data

(63) Continuation of application No. 15/742,266, filed as application No. PCT/EP2016/065391 on Jun. 30, 2016, now Pat. No. 10,584,199.

(30) Foreign Application Priority Data

Jul. 8, 2015 (EP) .................................. 15175956
Mar. 18, 2016 (EP) .................................. 16161224

(51) Int. Cl.
| | |
|---|---|
| *C08G 18/28* | (2006.01) |
| *C08L 83/04* | (2006.01) |
| *C08G 61/04* | (2006.01) |
| *C08G 18/75* | (2006.01) |
| *C08G 18/67* | (2006.01) |
| *C08G 18/48* | (2006.01) |
| *C08G 18/42* | (2006.01) |
| *C08G 18/10* | (2006.01) |
| *C08J 3/28* | (2006.01) |
| *C09D 175/16* | (2006.01) |
| *D01D 5/00* | (2006.01) |
| *D01F 11/08* | (2006.01) |
| *C08J 3/24* | (2006.01) |

(52) U.S. Cl.
CPC .......... *C08G 18/755* (2013.01); *C08G 18/10* (2013.01); *C08G 18/4277* (2013.01); *C08G 18/4833* (2013.01); *C08G 18/672* (2013.01); *C08G 18/673* (2013.01); *C08G 18/6725* (2013.01); *C08J 3/24* (2013.01); *C08J 3/28* (2013.01); *C09D 175/16* (2013.01); *D01D 5/0015* (2013.01); *D01F 11/08* (2013.01); *D10B 2401/02* (2013.01)

(58) Field of Classification Search
CPC .. C08J 3/24; C08J 3/28; C08G 18/673; C08G 18/672; C08G 18/6725; C08G 18/4833; C08G 18/4277; C08G 18/755; C08G 18/10; C08G 18/48; D01F 11/08; D01D 2401/02; C09D 175/16
USPC ................................. 524/590, 589, 1; 520/1
See application file for complete search history.

(56) References Cited

U.S. PATENT DOCUMENTS

| | | | |
|---|---|---|---|
| 1,506,471 A | 8/1924 | Wootton | |
| 4,366,206 A | 12/1982 | Tanaka | |
| 10,584,199 B2 * | 3/2020 | Dubruel | C08G 18/6725 |
| 2014/0275320 A1 * | 9/2014 | Jefferies | C08G 18/755 |
| | | | 522/111 |
| 2016/0297991 A1 * | 10/2016 | Siebertz | C08G 18/6674 |

FOREIGN PATENT DOCUMENTS

| | | |
|---|---|---|
| DE | 10 2005 035 235 A1 | 2/2007 |
| EP | 0 656 077 A1 | 6/1995 |
| WO | WO-2015/086796 A1 | 6/2015 |

OTHER PUBLICATIONS

International Search Report issued in International Patent Application No. PCT/EP2016/065391, dated Sep. 13, 2016.

* cited by examiner

*Primary Examiner* — Jessica Whiteley
(74) *Attorney, Agent, or Firm* — Foley & Lardner LLP

(57) ABSTRACT

The invention pertains to the technical field of urethane based materials, in particular to radiation curable urethane precursors that are cross-linkable in solid form and materials obtainable therefrom. In addition the invention pertains to methods for manufacturing these precursors and materials, and their uses. The invention is advantageous to the fields of i.e. coatings and biomedical applications.

20 Claims, 6 Drawing Sheets

URETHANE BASED MATERIALS, DERIVATIVES, METHODS OF THEIR PREPARATION AND USES

CROSS-REFERENCE TO RELATED APPLICATIONS

This application is a continuation of U.S. application Ser. No. 15/742,266, filed on Jan. 5, 2018, which is a 371 national application of International Application No. PCT/EP2016/065391, filed on Jun. 30, 2016; which claims the benefit of and priority to European Application No. 16161224.7, filed Mar. 18, 2016, and European Application No. 15175956.0, filed on Jul. 8, 2015; all of which are hereby incorporated by reference herein in their entireties.

TECHNICAL FIELD

The invention pertains to the technical field of urethane based materials, in particular to radiation curable polyurethane precursors that are cross-linkable in solid form and materials obtainable therefrom. In addition the invention pertains to methods for manufacturing these precursors and materials, and their uses. The invention is advantageous to the fields of coatings and biomedical applications.

BACKGROUND

Polyurethanes (PU) are well-known. They are a unique class of polymers that have a wide range of applications because their properties can be readily tailored by the variations of their components. Conventionally, PUs are extensively used as foams, coatings, adhesives, elastomers and fibers. PUs are also widely used as biomedical materials. PU hydrogels have applications as contact lenses, surgical implants, and separation membranes.

Curing by radiation, such as UV curing, saves energy and reduces or eliminates solvent emission in comparison with solvent-based systems because most formulations are 100% reactive oligomers and diluents. A UV-curable system is typically composed of reactive urethane oligomers, reactive diluents, and photoinitiators. Reactive urethane oligomer is the most important component in determining the ultimate physical properties of UV-cured coatings. Consequently, there is an increased demand for novel radiation curable PU precursors, not requiring the use of solvents.

Hydrogels have the potential to be useful in biomedical applications. However, one difficulty associated with hydrogel forming compositions is that certain compositions may worsen tissue inflammation at the site of administration. A possible explanation for this effect is that photo-initiators present in the composition may adversely affect tissues. Furthermore, inflammation can also be caused by the polymer constituting the hydrogel.

Techniques for making hydrogels are well-known. U.S. Pat. No. 1,506,471 describes a process for producing water swellable, cross-linked hydrogel polymer fibers, tapes or ribbons by extruding or spinning a solution of an isocyanate terminated prepolymer comprising the reaction product of a poly(alkyleneoxy)polyol having an average molecular weight up to 25000 g/mol and an organic diisocyanate into a cross-linking bath where said prepolymer is cross-linked by a crosslinking agent for the isocyanate terminated prepolymer which is either water or an organic polyamine. In this process the concentration of the crosslinking agent in the bath and the solvent choice are critical. Too high a concentration of cross-linker will lead to a simple end-capping reaction yielding a water soluble polymer rather than the desired hydrogel fibre. On the other hand, if the concentration of the cross-linker in the bath is too low, the product will have free isocyanate groups and the polymer will not be adequately cross-linked; this product will therefore not have adequate hydrogel properties. The bath solvents used are organic solvents including aliphatic and aromatic solvents. It would be useful if solvents could be avoided in a hydrogel fibre spinning process.

EP 0 656 077 discloses a method of producing water-absorbent fibre or film based on a water-soluble polymer starting material. The polymer is dissolved in water to form an aqueous solution which is then extruded into a heated gaseous environment. The polymer is cross-linked under the action of heat. After cross-linking the fibre is treated with moist air to raise the moisture content of the fibre. Without the crosslinking step the fibre or film will re-dissolve should it ever encounter water subsequently. The crosslinking step stabilizes the fibre or film so that on encountering water it absorbs the water without dissolving. However the more the material is heated and cross-linked, the less capable the product is of absorbing water. In addition, heating to a temperature in the range 125-250° C., is energy consuming. Furthermore, the temperature may damage the structure of the fibre or film caused by rapid vaporization of moisture at the high temperatures used for crosslinking It would be useful to develop novel PU materials that can be cross-linked without use of solvents or heat. Advantageously the PU materials are precursors for hydrogels and can be processed by methods which were previously inaccessible. The present invention aims to resolve at least some of the problems mentioned above.

SUMMARY OF THE INVENTION

The present invention thereto provides novel photo-curable urethane based pre-polymers. The invention also provides a process for making the pre-polymers and water-insoluble polyurethane materials derived thereof, such as hydrogels. In addition, the invention provides methods for processing the materials derived from the pre-polymers. For instance, the invention provides a process for electrospinning the pre-polymers into fibers without the need for a cross-linking bath or high temperature for cross-linking. In a final aspect the invention provides uses for pre-polymers and cross-linked polymers derived therefrom.

In a first aspect, the invention provides a (meth)acrylate functional urethane prepolymer, characterized in that, the ratio $r_p = h_{max, solid}/h_{max, molten}$ is equal to or larger than 1, and wherein $h_{max, solid}$ and $h_{max, molten}$, are the maximum heat flow values of the prepolymer measured by differential photocalorimetry (DPC) at solid state, preferably at 20° C., and at molten state, preferably 50° C. or 70° C. or 90° C. depending on the melting temperature of the prepolymer concerned, in nitrogen atmosphere in absence of a photoinitiator and in absence of solvent.

The solid and the molten states of a resin are differentiated by a first order thermodynamic transition for part of the material upon state change.

By the term "melting temperature" we mean the temperature at which the prepolymer melts. The melting temperature can be measured by conventional differential scanning calorimetry (DSC) where a sample is heated at a constant heating rate of 10° C./min. The onset of the melting endotherm is considered as the melting temperature of the prepolymer. The prepolymers of the present invention usually have a melting point of at least 25° C., preferably 27° C. to 200° C., and more preferably 30° C. to 100° C. The temperatures selected for DPC measurement, i.e. 50° C. or 70° C., are closest to the melting temperature of the selected prepolymer in the examples. The maximum heat flow values of the prepolymer are measured at 20° C., reference for the solid state, and at molten state, and compared to determine the $r_p$ value.

In a particularly preferred first aspect, the invention provides a (meth)acrylate functional urethane prepolymer, characterized in that, the ratio $r_p = h_{max, 20}/h_{max, 50}$ is equal to or larger than 1, and wherein $h_{max, 20}$ and $h_{max, 50}$, are the maximum heat flow values of the prepolymer measured by differential photocalorimetry (DPC) at 20° C. and 50° C. in nitrogen atmosphere in absence of a photo-initiator and in absence of solvent.

The inventors have unexpectedly found that a ratio $r_p$ equal to or larger than 1 is characterizing an increased reactivity of the prepolymers in the solid state. It is hypothesized that this is due to flexibility provided by the selected spacer compound. Due to their increased reactivity the prepolymers of the invention can be cross-linked, for instance by UV-curing, in solid form even without use of a photoinitiator. This opens up interesting perspective for processing techniques that were previously not suitable as it involved cross-linking of materials present in a solvent. The prepolymers according to an embodiment of the invention are interesting precursor materials for hydrogels.

Preferably the (meth)acrylate functional urethane prepolymer according to an embodiment of the invention, has the structure: end group-polyisocyanate-backbone-polyisocyanate-end group.

Preferably said prepolymer is obtained as the reaction product of:
(i) a glycol having a number-averaged molecular weight of from 390 g/mol to 25000 g/mol, preferably from 1000 g/mol to 25000 g/mol, more preferably from 1500 g/mol to 20000 g/mol,
(ii) a polyisocyanate,
(iii) a (meth)acrylate functionalized compound comprising at least one group capable of reacting with isocyanate groups, and separated from the (meth)acrylated moiety by a glycol-based spacer.

More preferably said (meth)acrylate functional urethane prepolymer is obtainable as the reaction product of:
(iv) a glycol having an number-averaged molecular weight of from 400 g/mol to 10000 g/mol,
(v) an polyisocyanate,
(vi) a (meth)acrylate functionalized compound comprising at least one group capable of reacting with isocyanate groups, and separated from the (meth)acrylated moiety by a glycol-based spacer.

By the term "glycol" as used herein in (i) is meant any class of organic compounds belonging to the polyol family. In the molecule of a glycol, hydroxyl (—OH) groups are attached to different carbon atoms. Preferably, a glycol comprises two hydroxyl groups. This group also covers polyalkylene oxide polyols, such as polyethylene oxide and polycaprolactone polyols.

Other preferred glycols are polyvinyl alcohols. Polyvinyl Alcohol (PVOH, PVA or PVAL) are synthesized by hydrolysis of polyvinylacetate. It is classified into two classes namely partially hydrolysed and fully hydrolysed. These are commercially available from Kuraray under the tradename Poval. Preferred are partially hydrolysed polyvinylalcohols.

By the term "glycol-based spacer" as used herein in (iii) is a polyol. Preferably said glycol-based spacer is a polyethylene glycol or a poly-ε-caprolactone.

By the term "polyisocyanate" as used herein is meant an organic compound comprising at least two isocyanate groups.

Most preferably said (meth)acrylate functional urethane prepolymer is of formula (Ia) or (Ib), wherein x is 1-10, R1 is a glycol-based spacer group, R2 is polyisocyanate derived, R3 is a backbone providing compound.

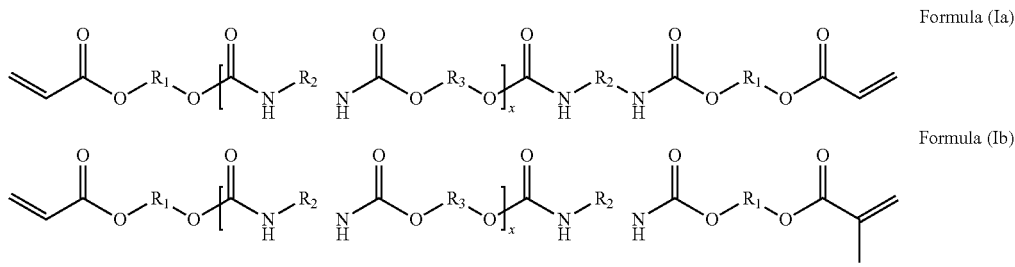

Formula (Ia)

Formula (Ib)

As can be seen from Formula (Ia) and (Ib), the prepolymer is preferably end-capped by unsaturated groups.

In a preferred embodiment, the (meth)acrylate functional urethane prepolymer according to an embodiment of the invention, is the reaction product of a poly(ethylene glycol), poly(ethylene glycol) mono (meth)acrylate and a polyisocyanate. In a particularly preferred embodiment, the (meth)acrylate functional urethane prepolymer according an embodiment of the invention which is the reaction product of a poly(ethylene glycol), poly(ethylene glycol) mono (meth)acrylate and a polyisocyanate, is of formula (II) with n is 45 (PEG 2000) and m=6, x=1–10; preferably x=1–3; n, m and x are average values.

cross-linking by radiating the material of the previous step, optionally in the presence of a photo-initiator.

In a preferred embodiment of said method, said cross-linking is in solid form, i.e. a solid form is used of the Formula (II)

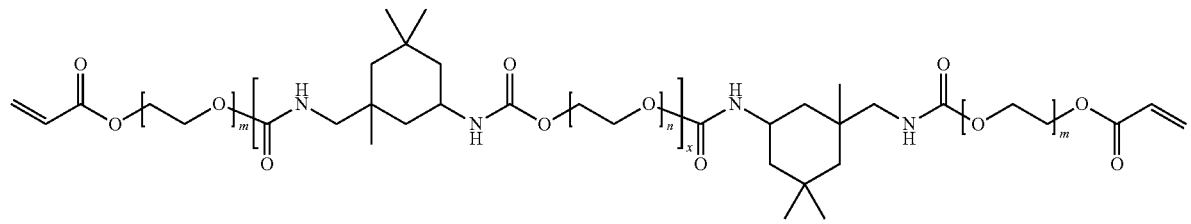

In a another preferred embodiment, the (meth)acrylate functional urethane prepolymer according to an embodiment of the invention, is the reaction product of a poly(ethylene glycol), poly-ε-caprolactone mono(meth)acrylate and a polyisocyanate.

Poly(ethylene glycol) based precursors provide interesting potential for use in biomedical applications.

Preferably, a (meth)acrylate functional urethane prepolymer according to an embodiment of the invention, is semi-crystalline.

In a second aspect, the invention provides a cross-linked material obtainable by cross-linking a (meth)acrylate functional urethane prepolymer according to an embodiment of the invention.

Cross-linking the prepolymer has for effect that the resulting polymer is water-insoluble.

Preferably said cross-linked material is solvent swellable, preferably water-swellable. These water-swellable materials are interesting hydrogels. By the term "hydrogel" as used herein, is meant a material that is capable of taking up water or a material that has taken up water.

In a preferred embodiment a cross-linked material according to an embodiment of the invention was cross-linked in absence of a photo-initiator. This has for effect that there is no photo-initiator present in the material. This is advantageous for medical applications as some photo-initiators are known to provide cytotoxicity.

In a third aspect, the invention provides in uses of (meth)acrylate functional urethane prepolymers according to an embodiment of the invention. In a preferred embodiment, a (meth)acrylate functional urethane prepolymer according to an embodiment of the invention, is used as a precursor for a cross-linked material. Preferably said use, is in a superabsorbent material, an ocular implant, soft tissue regeneration device, cardiovascular device, wound dressing, orthopaedic implant or tissue engineering scaffold, in a metal extraction, a thermotropic film, a barrier coating, an antifogging coating, a sound damping control, a thermal barrier material, a microwave protection or detection materials, a fire retardant intumescent coating, a membrane for water purification, encapsulation of seeds, in soft-feel coatings, in surface wrinkling for mat coating, in a strippable coating. Several of these articles have in common that moisture absorbency is desired.

In a further aspect, the invention provides a method for producing a urethane material comprising the steps of:
providing a (meth)acrylate functional urethane precursor according to an embodiment of the invention, preferably in solid form, and (meth)acrylate functional urethane precursor according to an embodiment of the invention.

Preferably, said material is a water-swellable electrospun fibre material obtained from
electrospinning a solution of a water-soluble prepolymer into an inert gaseous medium to form fibre and thereafter,
cross-linking the fibre, preferably in absence of a photo-initiator and/or in absence of a solvent, to a degree sufficient that the cross-linked fibre is water-insoluble.

The materials selected do not require that the fibre is collected in a solution, which is then processed further to obtain cross-linked materials. Instead, they are produced in dry form and cross-linking is carried out after fibre making. This has for effect that the polymers are still swellable after cross-linking. Novel electrospun hydrogel materials are provided.

DETAILED DESCRIPTION OF THE INVENTION

Figure 1:
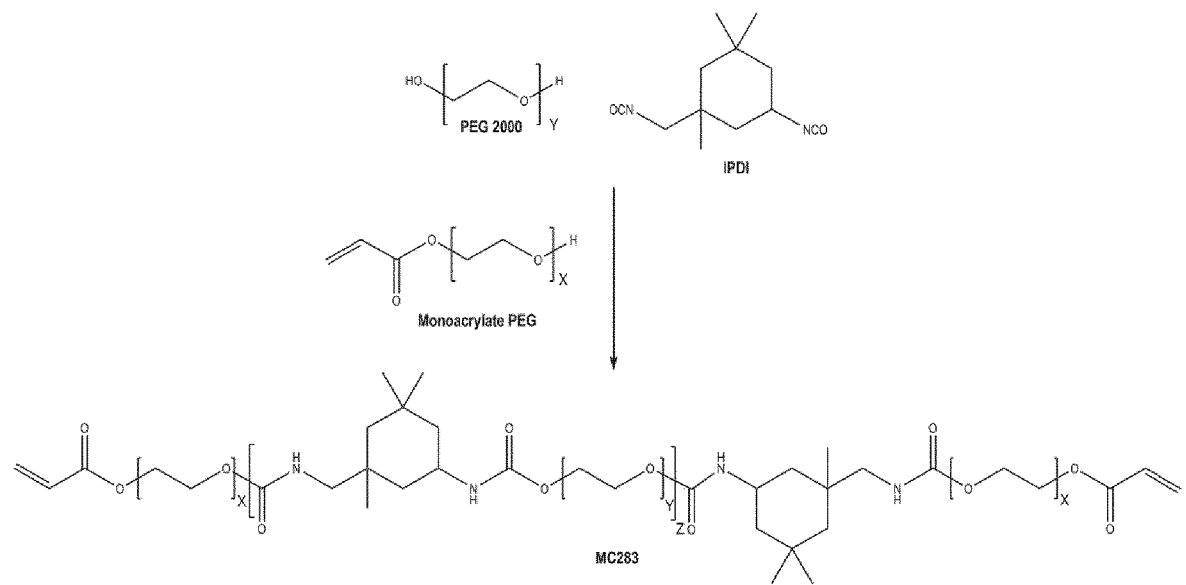
FIG. 1: Synthesis of a preferred (meth)acrylate functional urethane prepolymer according to an embodiment of the invention (MC283), with X=6, Y=45 and Z=1 to 3. X, Y and Z are average values.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

The present invention concerns novel urethane based polymer precursors, polymeric materials based on these precursors, their uses and methods of manufacturing.

In a first aspect, the present invention provides urethane-based prepolymers that are photo-curable in solid form. With the term "photo-curable prepolymer" as used herein, is meant a composition which is solidified on exposure to radiation with a wavelength of less than 400 nm, such as UV, electron, X- or gamma rays. UV radiation is particularly preferred. The dose required for curing is dependent on the photo initiator used, wavelength at which the photo-initiator forms radicals and the spectrum of the radiation source (e.g. UV-A, LED). The dose required for curing will be situated in the range 1-1000000 mJ/cm², determined by the intensity of the radiation source expressed as mW/cm² multiplied by the time of radiation in seconds. Preferably, the minimal UV dose used is 1 mJ/cm². More preferably, the minimal UV dose used is 25 mJ/cm², this equals 5 seconds of irradiation with an intensity of 5 mW/cm². The photo-curability is provided by the presence of double bonds in the precursor compound. These can be provided by acrylate- or methacrylate-groups. In the text this will be provided by use of the term (meth)acrylate-. In addition, the structure of the prepolymer is important.

The inventors have unexpectedly found that a (meth)acrylate functional urethane prepolymer according to the invention has sufficient radiation sensitive groups to allow photopolymerization in the solid state, even without photo-initiator. This situation is compared to photopolymerization in the molten state. It is characterized by $r_p$ equal to or larger than 1, wherein $r_p$ is the ratio between the maximum heat flow values at 20° C. and 50° C., and is expressed as $$r_p = \frac{h_{max,20}}{h_{max,50}}.$$

Maximum heat flow values are measured by differential photocalorimetry (DPC), as explained in example 7. In cases where the melting temperature of the prepolymer is higher than 50° C., the second measurement is carried out at a temperature wherein the prepolymer is molten, preferably at 70° C. or 90° C., whatever is higher than the melting temperature. Measurements are performed in nitrogen atmosphere and in absence of photo-initiator and in absence of solvent. This $r_p$ value provides a measure of relative photo-reactivity. When the $r_p$ value equals or is larger than 1, the maximum polymerization rate is higher at 20° C. than at the measurement temperature representative for the molten state, preferably 50° C. This was quite unexpected as polymerization usually accelerates upon temperature increase.

The inventors have found that an $r_p$ equal to or larger than 1 is characterizing an increased reactivity of the prepolymers in solid form. It is hypothesized that this is due to flexibility provided by the selected spacer compound. Due to their increased reactivity they can be cross-linked, for instance by UV-curing, in solid form even without use of a photo initiator.

By the term "cross-linking" as used herein, is meant that connection between different prepolymers are formed. Another term, which can be considered as a synonym to cross-linking in the context of the present invention, is curing.

In a preferred embodiment, said (meth)acrylate functional urethane prepolymer of formula (I), is having the structure end group-polyisocyanate-backbone-polyisocyanate-end group. In a more preferred embodiment, said (meth)acrylate functional urethane prepolymer is of formula (I), having the structure end group-diisocyanate-backbone-diisocyanate-end group. This structure is advantageous as it provides compounds that are end-capped by unsaturated groups, provided by a (meth)acrylate group.

By the term "polyisocyanate" as used herein is meant an organic compound comprising at least two isocyanate groups. The polyisocyanate compound usually comprises not more than three isocyanate groups. The polyisocyanate compound is generally selected from aliphatic, cycloaliphatic, aromatic and/or heterocyclic polyisocyanates or combinations thereof. The polyisocyanate compound (i) is most preferably a di-isocyanate.

Examples of aliphatic and cycloaliphatic polyisocyanates are 1,6-diisocyanatohexane (HDI), 1,1'-methylene bis[4-isocyanatocyclohexane] (H12MDI), 5-isocyanato-1-isocyanatomethyl-1,3,3-trimethylcyclohexane (isophorone diisocyanate, IPDI), 1,6-diisocyanato-2,4,4-trimethylhexane (TMDI). Aliphatic polyisocyanates containing more than two isocyanate groups are for example the derivatives of above mentioned diisocyanates like 1,6-diisocyanatohexane biuret and isocyanurate and trimers of the above mentioned polyisocyanates. Especially preferred is 5-isocyanato-1-isocyanatomethyl-1,3,3-trimethylcyclohexane (isophorone diisocyanate, IPDI).

Examples of aromatic polyisocyanates are 1,4-diisocyanatobenzene (BDI), 2,4-diisocyanatotoluene (TDI), 1,1'-methylenebis[4-isocyanatobenzene] (MDI), xylilene diisocyanate (XDI), tetramethylxylilene diisocyanate (TMXDI), 1,5-naphtalene diisocyanate (NDI), tolidine diisocyanate (TODI) and p-phenylene diisocyanate (PPDI). The polyisocyanate is preferably selected from aliphatic and cycloaliphatic polyisocyanates, more preferably diisocyanates.

The groups flanking the backbone are preferably provided by polyisocyanate, more preferably a diisocyanate. A preferred diisocyanate is isophorone diisocyanate (IPDI).

The backbone is preferably provided by a glycol, preferably a polyethylene glycol, or a poly-ε-caprolactone-based glycol, for instance obtained as reaction product of a polyol and a caprolactone.

In another preferred embodiment the backbone is a polyester or a polyether. In yet another embodiment the backbone is a polyamide, poly α-hydroxyalkaloid, polysaccharide, polyoxazoline, polyethyleneimine, α,ω-dihydroxy polyisobutylene or α,ω-dihydroxy polyisobutylene.

Preferably the glycol has an average molecular weight of from 390 to 25000 g/mol, also preferably 400 to 10000 g/mol, more preferably 1000 to 5000 g/mol, even more preferably 1500 to 3000 g/mol, most preferably 2000 g/mol. Preferably the polycaprolactone has an average molecular weight of 400 to 10000 g/mol, even more preferably 1500 to 3000 g/mol, most preferably 2200 g/mol.

The end groups are preferably a (meth)acrylate functionalized compound comprising at least one group capable of reacting with isocyanate groups, preferably hydroxyls, and separated from the (meth)acrylated moiety by a glycol-based spacer. This type of spacer was found to provide flexibility and mobility to the oligomer. Preferably the glycol-based spacer has a number-average molecular weight of 50-650 g/mol. Preferably the glycol-based spacer has a number-average molecular weight of 60-600 g/mol. In a preferred embodiment, said glycol-based spacer has a number-average molecular weight of at least 60 g/mol, more preferably 70 g/mol, even more preferably 80 g/mol, most preferably at least 90 g/mol. Advantageous spacer compounds for use in the present invention are polyethylene glycols, preferably polyethylene glycols with an average of 5-6 units. (Meth)acrylate functionalized compounds are commercially available under the names Bisomer PEA6, which is an acrylate with a number-averaged molecular weight of 336 g/mol and Bisomer PEM6, which is a methacrylate with a number-averaged molecular weight of 350 g/mol. Also advantageous is a poly-ε-caprolactone of 2 units on average; commercially available under the name Tone M100 by GEO Specialty Chemicals, previously by Dow. It is an acrylate with a number-averaged molecular weight of 334 g/mol. Poly(ethylene glycol) based precursors provide interesting potential for use in biomedical applications.

polymer is the reaction product of a poly(ethylene glycol), a poly(ethylene glycol) mono (meth)acrylate and a diisocyanate, preferably isophorone diisocyanate.

In another preferred embodiment of a prepolymer according to the invention, the (meth)acrylate functional urethane prepolymer is the reaction product of a poly-ε-(caprolactone), poly(ethylene glycol) mono (meth)acrylate and a diisocyanate, preferably isophorone diisocyanate.

In yet another preferred embodiment of a prepolymer according to the invention, the (meth)acrylate functional polyurethane prepolymer is the reaction product of a poly(caprolactone), poly(caprolactone) (meth)acrylate and a diisocyanate, preferably isophorone diisocyanate.

In another preferred embodiment of a prepolymer according to the invention, the (meth)acrylate functional urethane prepolymer is the reaction product of a poly(ethylene glycol), caprolactone (meth)acrylate and a polyisocyanate.

In a preferred embodiment, said (meth)acrylate functional urethane prepolymer is of formula (Ia) or (Ib), x is 1-10, preferably 1-3, $R_1$ is a glycol-based spacer group, $R_2$ is polyisocyanate derived, $R_3$ is a backbone providing compound.

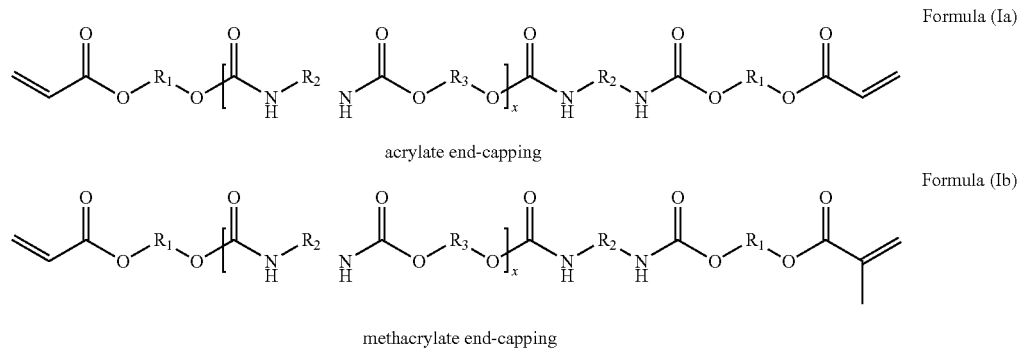

Formula (Ia)

acrylate end-capping

Formula (Ib)

methacrylate end-capping

Preferably said prepolymer is obtained as the reaction product of:
(i) a glycol having a number-averaged molecular weight of from 390 g/mol to 25000 g/mol, preferably from 1000 g/mol to 25000 g/mol, more preferably from 1500 g/mol to 20000 g/mol,
(ii) a polyisocyanate,
(iii) a (meth)acrylate functionalized compound comprising at least one group capable of reacting with isocyanate groups, and separated from the (meth)acrylated moiety by a glycol-based spacer.

Most preferably said prepolymer is obtained as the reaction product of:
(iv) a glycol having a number-averaged molecular weight of from 400 g/mol to 10000 g/mol,
(v) a polyisocyanate,
(vi) a (meth)acrylate functionalized compound comprising at least one group capable of reacting with isocyanate groups, and separated from the (meth)acrylated moiety by a glycol-based spacer.

In a preferred embodiment, the at least one group capable of reacting with isocyanate groups, is a hydroxyl group (—OH). More preferably the isocyanate reactive groups of said (meth)acrylated compound (a) are hydroxyl groups.

In a preferred embodiment of a prepolymer according to the invention, the (meth)acrylate functional urethane pre- In a preferred embodiment, the ratio of the hydroxyl equivalent, resulting from the hydroxyl-bearing compounds (glycol and (meth)acrylate functionalized compounds), and the isocyanate equivalent, resulting from the polyisocyanates, is between 0.7 and 1.3; more preferably, between 0.8 and 1.2 and most preferably between 0.9 and 1.1.

In a preferred embodiment, a (meth)acrylate functional urethane prepolymer according to an embodiment of the invention is semi-crystalline. By the term "semi-crystalline prepolymer" as used herein, is meant a material that is composed of amorphous and crystalline regions, called crystallites.

Whether a material is crystalline or partially crystalline can be verified by conventional differential scanning calorimetry (DSC). In the present invention, thermograms were recorded using a Mettler DSC823e instrument after suitable calibration with indium. Standard aluminum crucibles of 20 µL were used and the sample mass was typically between 3 and 4 mg. Dry nitrogen was used as flow gas (flow rate of 50 mL min$^{-1}$). First, to anneal the material, the sample was heated at a rate of 10° C. min$^{-1}$ to 60° C. Next, the sample was cooled to −20° C. at a rate of −5° C. min$^{-1}$. In the cooling run, crystallization events are established from crystallization exotherms. Finally upon heating a second time to 70° C. at a rate of 10° C. min$^{-1}$ the presence of (partially) crystallized domains could further be confirmed from endothermic melting peaks in the thermograms.

In a preferred embodiment, a (meth)acrylate functional urethane prepolymer according to an embodiment of the invention, when the backbone is based on poly(ethylene glycol), has a water solubility of at least 1 g pre-polymer/g water, as measured in demineralized water at 25° C.

In another preferred embodiment, a (meth)acrylate functional urethane prepolymer according to an embodiment of the invention, when the backbone is based on polycaprolactone, has a water solubility of at most 0.5 g/g water, and most preferably at most 0.1 g/g water, measured in demineralized water at 25° C.

In a most preferred embodiment, a (meth)acrylate functional urethane prepolymer according to an embodiment of the invention, is of formula (II) with n is 45 (PEG 2000), m is 6, and x is 1-10, preferably x is 1-3; n, m and x are average values.

from 10 to 90 wt %, and more preferably from 20 to 80 wt % water, expressed as weight of water on total weight of the composition.

In addition to the (meth)acrylate functional polyurethane prepolymer according to the invention, other cross-linkable compounds or polymers may be present in the composition.

The presence of a photo initiator in the cross-linkable composition is optional. It was found that the composition does not require an initiator to be present in order to obtain curing at reasonable exposure times in conjunction with various forms of energetic radiation, especially UV-radiation.

Thus, presence of initiator related toxicity is avoided. Exposure times are typically in the range of 1 millisecond to 60 minutes, using UV-radiation.

Formula (II)

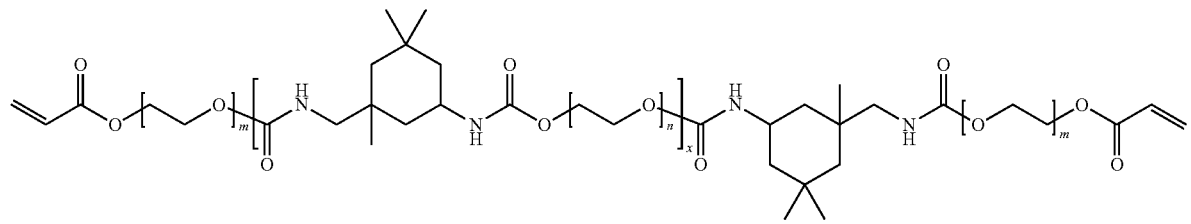

This compound of formula (II) with x is 1-3, is a semi-crystalline material, solid at room temperature of 25° C., $M_n$ 3800 g/mol, $M_w$ 7580 g/mol, melt temperature of: ≈35° C., glass transition temperature $T_g$ of −38° C. This compound is a hydrogel precursor that can be synthesized from poly(ethylene glycol) of molecular weight 2000 g/mol, poly(ethylene glycol) mono acrylate and isophorone diisocyanate. Use of this preferred compound of Formula (II) with x is 1-3, is advantageous as it allows for tunable transparency of a polymer obtained from the precursor. Curing of this precursor above its melting point provides clear, flexible samples. Curing below its melting point provides opaque, rigid samples. As shown in Table 2 (example 7), the $r_p$ value exceeds 1.

Figure 11:
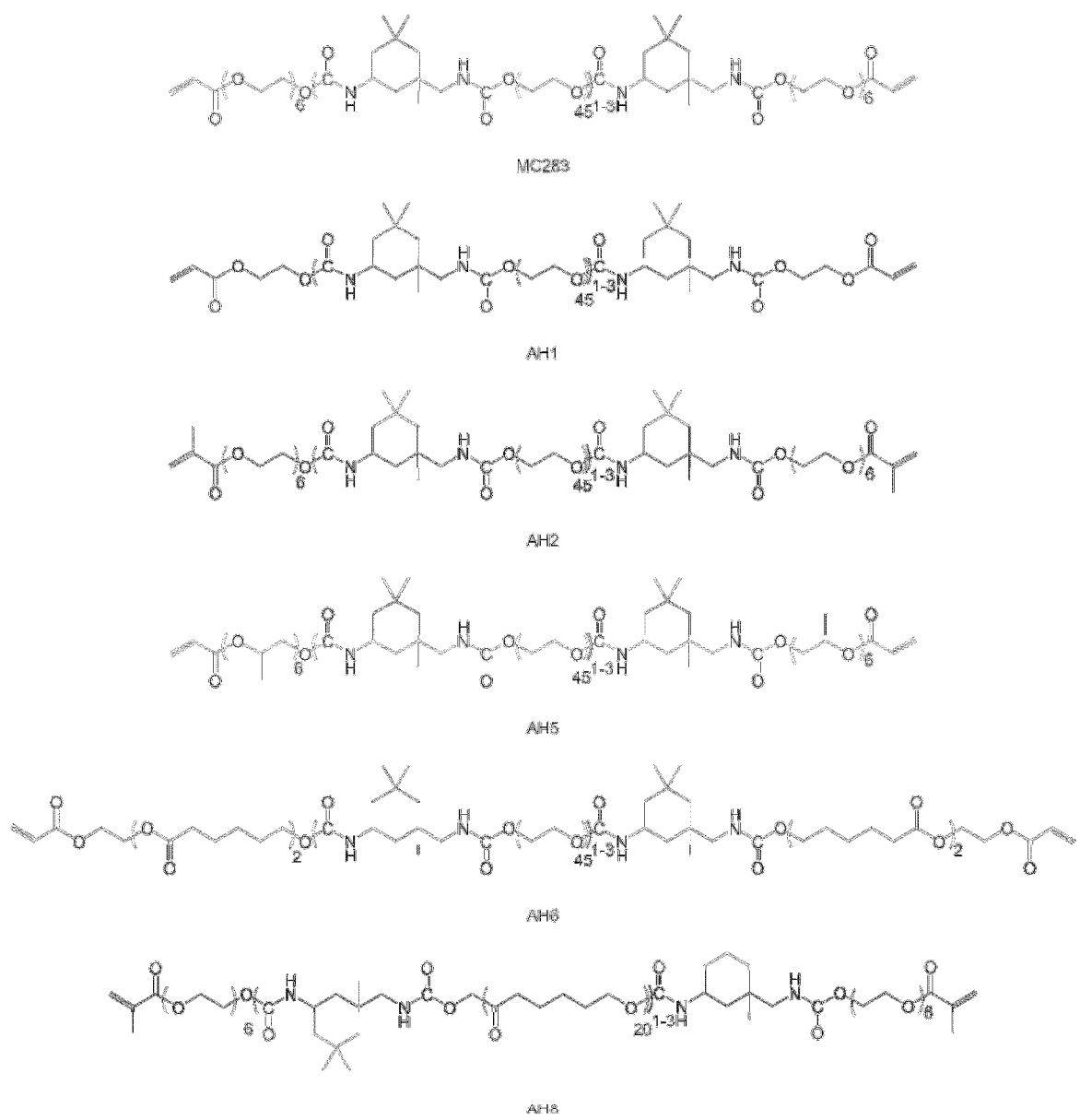
FIG. 11: Overview of urethane precursors.

Other preferred compounds according to embodiments of the invention are provided in FIG. 11 denominated as AH2, AH6, AH8. As can be seen from Table 2 (example 7), all these compounds have $r_p$ values exceeding 1.

The invention also provides compositions comprising said precursors. In a preferred embodiment a composition comprises (meth)acrylate functional urethane prepolymer 5 to 95 wt %, preferably 10 to 90 wt %, more preferably 20 to 80 wt %, even more preferably 30 to 60 wt % of (meth)acrylate pre-polymer, by total weight of the composition.

The compositions cover aqueous compositions of the prepolymers. Water can be added to the (meth)acrylate functional polyurethane prepolymer. Preferably a prepolymer composition comprises from 0 to 99 wt %, preferably The polymerization process can be initiated by the presence of a photo-initiator. The photo-initiator encompasses any molecule capable to initiate a radical poly-addition reaction of the (meth)acrylate-functional components by the action of light.

In a preferred embodiment, said photo initiator is selected from the list of a benzophenone; 1-hydroxy-cyclohexyl phenyl ketone; 2,4,6-trimethyl benzophenone; 3,3-dimethyl-4-methoxy-benzophenone; benzyl dimethyl ketal; oligo (2-hydrox-2-methyl-1-(4-(1-methyl-vinyl)phenyl)pro-panone; 2,2-dimethoxy-1,2-diphenylethan-1-one; 2-hydroxy-2-methyl-1-phenylpropan-1-one; bis (2,4,6-trimethylbenzoyl)pheny phosphine oxide; 2,4-diethylthioxanthoine; ethyl p-dimethylaminobenzoate; isoamyl p-dimethylaminobenzoate; bis ($n^5$-2,4-cyclopenta-dien-1-yl)-bis(2,6-difluoro-3-(1H-pyrrol-1-yl)-phenyl) titanium, 2-hydroxy-2-propyl 4-(hydroxyethoxy)phenyl ketone (Irgacure 2959), 1-hydroxycyclohexyl phenyl ketone (Additol CPK, available from Allnex), 1,4-bis(4-(N,N-bis(6-(N,N,N-trimethylammonium)hexyl)amino)-styryl)-2,5-dimethoxy benzene tetra iodide) (WSPI), P2CK, G2CK, E2CK, macromolecular photo initiators, or mixtures thereof.

In a more preferred embodiment, said photo initiator is selected from the list of 2-hydroxy-2-propyl 4-(hydroxyethoxy)phenyl ketone (Irgacure 2959), 1-hydroxycyclohexyl phenyl ketone (Additol CPK, available from Allnex), 1,4-bis(4-(N,N-bis(6-(N,N,N-trimethyl ammonium)hexyl) amino)-styryl)-2,5-dimethoxy benzene tetra iodide) (WSPI), P2CK, G2CK, E2CK, macromolecular photo initiators, or mixtures thereof. The selection of these photo initiators is of particular interest as they have been shown to display reduced cytotoxicity (Li et al., RSC Advances, 26 Jun. 2013). This is advantageous for biomedical applications.

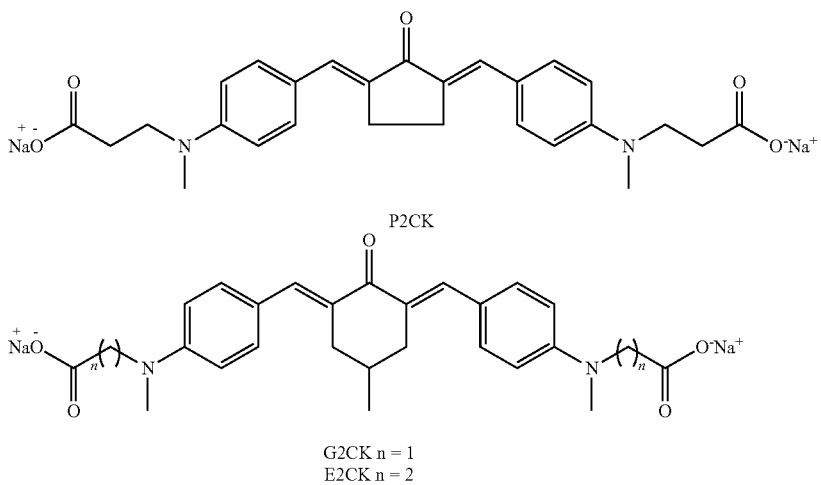

P2CK

G2CK n = 1
E2CK n = 2

The photo initiators if present are usually added in an amount ranging from 0.01 to 20 percent by weight, suitably 0.05 to 5% by weight, preferably 0.1 to 1, more preferably 0.1 to 0.5 wt % of the photo-curable composition in the present invention.

In a preferred embodiment, a hydrogel precursor is combined with a layered mineral material, preferably a clay based additive, more preferably a hectorite clay, most preferably a "Laponite" clay. This combination allows the modification of the rheological properties and thixotropic behaviour.

In a preferred embodiment the hydrogel precursor is combined with a clay such as smectites and/or montmorillonites; such as bentonite; beidellite, nontronite, hectorite, fluorohectorite, saponite, sauconite; volkshonskoite, medmontite, pimelite, stevensite and/or stephanite; vermiculites such as clinochlore, chamosite, nimite, bailychlore, donbassite, cookite, sudoite, franklinfurnaceite and/or corrensite.

Especially preferred is the use of a predominantly Si/Mg smectite clay known as LAPONITE produced by Laporte of the United Kingdom. LAPONITE is a registered trademark of Laporte Absorbents. A further useful characteristic of the compositions of this invention is that they are capable of rapid and reversible gelling.

The synthetic hectorite is added first to the water used in forming the slurry or blended with water to form a liquid concentrate containing about 2-10% by weight of the synthetic hectorite.

A preferred synthetic hectorite clay for use in the invention is LAPONITE RD which is a free flowing synthetic layered silicate having illustrative characteristics of a bulk density of 1,000 kg/m$^3$, a surface area (BET) of 370 m$^2$/g, a pH of a 2% suspension in water of 9.8. The composition on a dry basis by weight is 59.5% $SiO_2$, 27.5% MgO, 0.8% $Li_2O$, and 2.8% $Na_2O$, Loss on ignition is 8.2%.

Another synthetic hectorite which is especially useful is LAPONITE RDS which incorporates an inorganic polyphosphate. This synthetic hectorite is also a free flowing synthetic layered silicate illustratively having a bulk density of 1,000 kg/m$^3$, a surface area (BET) of 330 m$^2$/g, a pH of a 2% suspension in water of 9.7. The composition on a dry basis by weight is 54.5% $SiO_2$, 26.0% MgO, 0.8% $Li_2O$, 5.6% $Na_2O$, and 4.1% $P_2O_5$. Loss on ignition is 8.0%.

In a second aspect, the invention provides a cross-linked material obtainable by cross-linking a solid form of a (meth)acrylate functional urethane prepolymer according to an embodiment of the invention. Cross-linking the prepolymer has for effect that the resulting polymer is solvent-insoluble; preferably water-insoluble.

In a preferred embodiment, said material was cross-linked in absence of a photo-initiator. Thus, said cross-linked material is substantially free of photo-initiator. Materials previously described can be cross-linked in solid form without the requirement of using a photo-initiator. This has the advantage that cytotoxicity linked to the presence of photo-initiator can be avoided. This is particularly advantageous for medical applications of hydrogels.

In a preferred embodiment, said cross-linked material, is water-swellable, i.e. it forms a hydrogel on absorption of water. This is the case with polyethylene glycol in the backbone of compounds of formula (I). Inventors have found that a hydrogel is not formed with poly-ε-caprolactone in the backbone of a formula (I) compound. With poly-ε-caprolactone in the backbone, an organogel is formed. This is similar to a hydrogel, but with organic solvent instead of water.

In a preferred embodiment, the cross-linked material is in the form of a fibre, preferably an electrospun fibre.

Electrospinning provides a method for generating non-woven, three-dimensional, porous fibre-based matrices. The basic set-up consists of three components including a high voltage power supply, a metallic needle and a grounded collector plate. A syringe containing a pre-polymer melt or solution is connected to the metal needle and the flow rate of the feed is controlled by a syringe pump. Application of a high voltage (1 to 30 kV) results in an electrified, pendant drop at the tip of the needle. Taylor cone formation occurs due to a combination of two types of electrostatic interactions: (i) electrostatic repulsion between similar surface charges and (ii) Coulomb interactions exerted by the external electric field. Eventually, the electrostatic repulsion overcomes the surface tension of the polymer solution and a liquid jet is ejected. The electrified jet undergoes stretching and the solvent evaporates during "time of flight" towards the collector. Micro- to nanometer scale fibers are deposited randomly onto the grounded collector plate. Electrospun micro- and nanofibrous structures possess a high surface area to volume ratio, providing relatively more substrate for cell attachment in biomedical applications. In addition, interconnected porous networks are formed which facilitate the transport of nutrients and metabolites throughout the network. The architecture of processed electrospun scaffolds mimics the extracellular of soft tissue to a high extent. Cell attachment and cell proliferation are promoted as a result of these advantageous characteristics. The application of electrospun materials in tissue engineering applications may range from bone, cartilage, vascular, neural to bladder regeneration.

In a preferred embodiment, said electrospun fibre has a swelling degree of 10% to 1000%, more preferably 50% to 500%, even more preferably 100% to 300%, most preferably 150% to 200%. In a more preferred embodiment, said electrospun fibre is an acrylate end-capped urethane-based poly (ethylene glycol) of formula (II), with n is 45 (PEG 2000), m is 6, and x is 1-10, preferably x is 1-3; n, m and x are average values.

The swelling ratio is expressed as the amount of solvent, preferably water, a hydrogel can contain at equilibrium swelling. Factors determining the swelling ratio are the nature and the cross-linking degree of the hydrogel. The swelling ratio is determined by measuring the mass of the equilibrium swollen samples ($m_{swollen}$) and the mass of the dried or lyophilized samples after swelling ($m_{dry, after\ swelling}$). The swelling ratio is then calculated as follows:

$$\text{Swelling Ratio } [\%] = 100 \times \left( \frac{m_{swollen}}{m_{dry, after\ swelling}} - 1 \right)$$

Another parameter by which a hydrogel can be characterized is the gel fraction. The gel fraction of a hydrogel is defined as the insoluble fraction of a dried sample. Interestingly, it provides a measure of the level of cross-linking of the network. Therefore, separation of the soluble fraction, also called sol fraction, from the gel fraction is needed. The dried or lyophilized mass of the samples is determined prior to swelling ($m_{dry, before\ swelling}$), and subsequently submerged in deionized water or another solvent until equilibrium swelling is obtained. In this process, all leachables will migrate from the hydrogel sample into the water or solvent. After swelling, the samples are removed from the water or solvent, lyophilised and weighed again ($m_{dry, after\ swelling}$). The gel and sol fractions are then determined as follows:

$$\text{Gel fraction } [\%] = 100 \times \frac{m_{dry, after\ swelling}}{m_{dry, brefore\ swelling}}$$

$$\text{Sol fraction } [\%] = 100 - \text{Gel fraction } [\%]$$

In a preferred embodiment, the gel fraction is at least 50%, preferably at least 55%, more preferably at least 60%, even more preferably at least 65%, most preferably at least 70%. By the term "water-insoluble" as used herein is meant a sol fraction of less than 50%, preferably less than 30%, more preferably less than 10%, most preferably less than 5%; or in other words a gel fraction of more than 50%, preferably more than 70%, more preferably more than 90%, most preferably more than 95%.

In a further aspect, the invention provides uses for a (meth)acrylate functional urethane prepolymer according to an embodiment of the invention.

In a preferred embodiment, a (meth)acrylate functional urethane prepolymer according to the invention, is used as a precursor for cross-linked electrospun fibers. Preferably, said electrospun fibre is an acrylate end-capped urethane-based poly (ethylene glycol) of formula (II), with n is 45 (PEG 2000), m is 6, and x is 1-10, preferably x is 1-3; n, m and x are average values.

In a preferred embodiment, a (meth)acrylate functional urethane prepolymer according to the invention, is used in articles in which moisture absorbency is desired.

The article in which moisture absorbency is desired is preferably a superabsorbent material, an ocular implant, soft tissue regeneration device, cardiovascular device, wound dressing, orthopaedic implant or tissue engineering scaffold.

In a further aspect of the invention, uses are provided for the cross-linked material of the invention, in particular in a metal extraction, a thermotropic film, a barrier coating, an antifogging coating, a sound damping control, a thermal barrier material, a microwave protection or detection materials, a fire retardant intumescent coating, a membrane for water purification, encapsulation of seeds, in soft-feel coatings, in surface wrinkling for mat coating, in a strippable coating.

In another aspect, the invention provides in a method for producing a urethane material comprising the steps of:
providing a (meth)acrylate functional urethane precursor according to an embodiment of the invention, preferably in solid form, and
cross-linking by radiating the material of the previous step, optionally in the presence of a photo-initiator.

Preferably said method is for producing a water-insoluble urethane material and comprises the steps of:
providing a water-soluble (meth)acrylate functional urethane precursor according to an embodiment of the invention, in solid form or in form of an aqueous mixture, and
radiating the material of the previous step, optionally in the presence of a photo-initiator, to a degree sufficient that the resulting urethane polymer is water-insoluble.

The material obtained is preferably a water-swellable electrospun fibre material. It can be obtained from
electrospinning a solution of a water-soluble prepolymer into an inert gaseous medium to form fibre and thereafter,
cross-linking the fibre, preferably in absence of a photo-initiator and/or in absence of a solvent, to a degree sufficient that the cross-linked fibre is water-insoluble.

The materials selected do not require that the fibre is collected in a solution, which is then processed further to obtain cross-linked materials. Instead, they are produced in dry form and cross-linking is carried out after fibre making. As a result the material can still be shaped as it is not yet cross-linked. Novel electrospun hydrogel materials are provided.

In a preferred embodiment, cross-linking is in absence of a photo-initiator. Thus, presence of initiator related toxicity is avoided. An additional advantage is that a mixing step of photo-initiator and prepolymer is avoided. There are less problems with instability, inhomogeneous mixtures.

In another preferred embodiment, cross-linking is in the presence of a photo-initiator and said photo-initiator is selected from 2-hydroxy-2-propyl 4-(hydroxyethoxy)phenyl ketone (Irgacure 2959), 1-hydroxycyclohexyl phenyl ketone (Additol CPK, available from Allnex), 1,4-bis(4-(N,N-bis (6-(N,N,N-trim ethyl ammonium)hexyl)amino)-styryl)-2,5-dimethoxy benzene tetra iodide) (WSPI), P2CK, G2CK, E2CK, macromolecular photo initiators, or mixtures thereof. A selection from this list is advantageous as these photo initiators have low cytotoxicity.

In a preferred embodiment, cross-linking is in absence of a solvent, especially water. This has for effect that cross-linking is carried out on material in solid form. Avoidance of solvent in this step has the advantage that the material can be shaped and subsequently cross-linked in the shape of choice.

Pre-polymers according to an embodiment of the invention can be shaped/processed in a number of ways including electrospinning, 3D plotting, 3D printing, 3D templating, film casting, porogen leaching, cryogen treatment, coatings, cross-linkable micelles, 2 photon polymerization, spin coating, electrospraying, spray drying, spray coating, roller coating, curtain coating, dip coating.

The electrospinning process comprises electrospinning of solutions of a hydrogel precursor, crosslinking after electrospinning whereby solvent evaporates and crosslinking of fibers occurs in the solid state.

In direct 3D plotting, three-dimensional porous scaffolds can be produced by sequential fibre deposition using a fused deposit modelling device such as the Bioplotter pneumatic dispensing system (Envisiontec, GmbH, Gladbeck, Germany). Strut and strand are alternative terms commonly used to indicate the deposited fibre. Briefly, the device can operate as a three-axis dispensing machine that deposits the molten urethane precursors, or solutions thereof pneumatically or mechanically on a collector platform. Designed CAD/CAM models are translated into machine code by using the appropriate software and contain the information for the layer-by-layer scaffold build-up. 3D structure retention can be obtained by solidification of the precursor melt, and post processing UV curing. Alternately, the sample can be irradiated with UV light during the extrusion of the melt or solution.

In 3D printing, scaffolds are illuminated with UV LEDs during printing, or after 3D printing. Printing can occur by melting the pre-polymer of from a solution of the pre-polymer.

In 3D templating, a template from poly-ε-caprolactone (PLC), polylactic acid (PLA), or other soluble polymer is immersed in a solution of pre-polymer or molten pre-polymer. After curing, the template is dissolved in a suitable solvent, e.g. chloroform, and the cross-linked structure remains.

In film casting, a prepolymer is molten or dissolved and poured/injected between two glass plates. Glass plates are placed under UV light to create a cross-linked sheet.

In a further aspect, the invention provides in cross-linked electrospun fibre material obtainable by a electrospinning process according to an embodiment of the invention.

In porogen leaching, particles are mixed with a pre-polymer solution or melt, and dissolved after crosslinking, creating pores in the structure.

In cryogenic treatment, an aqueous solution of the pre-polymer is frozen and ice crystals are formed. After freeze drying, these crystals are removed trough sublimation, resulting in a porous structure.

In a preferred embodiment, microparticles are prepared by electrospraying or spray drying.

The invention also provides a composition comprising a cross-linked material according to an embodiment of the invention. In a preferred embodiment said composition is a coating formulation, an adhesive formulation, an overprint varnish, an ink.

The invention also provides a composition comprising a cross-linked electrospun fibre according to an embodiment of the invention. Preferably said composition, further comprises a bio-polymer and/or a chemically modified biopolymer. The term "biopolymer," as used herein, is understood by those skilled in the art and generally refers to a special class of polymers produced by living organisms and that are biodegradable. A biopolymer may include any polymer (a long repeating chain of atoms) found in nature. In a preferred embodiment, said bio-polymer is selected from the list alginate, a gelatine, hyaluronic acid, chitosan, a peptide, a protein, a polysaccharide, carrageenan, agar, guar, pectin, or a mixture thereof.

In a final aspect, the invention provides in (bio-)medical uses of said compositions. Preferably, a composition comprising a cross-linked electrospun fibre according to an embodiment of the invention is for use as a medicament, preferably for use in wound healing.

The present invention will be now described in more details, referring to examples that are not limitative.

Example 1: Synthesis of MC283

The following description provides a method of manufacturing a (meth)acrylate functional polyurethane prepolymer according to an embodiment of the invention, with $r_p$ larger than 1.

Synthesis

Poly(ethylene glycol) with MW 2000 g/mol was obtained from Merck. Butylhydroxytoluene was obtained from Innochem GMBH. Isophorone diisocyanate was obtained from BASF or from Evonik. Bisomer PEA6 was obtained from GEO Specialty Chemicals UK Ltd. Dibutyl tin dilaurate was obtained from Perstorp Chemicals GMBH.

Urethane acrylate hydrogel precursors were prepared as indicated in FIG. 1 by adding 800 g of poly(ethylene glycol) (PEG) with MW 2000 g/mol, 0.62 g of butyl hydroxytoluene (BHT) and 0.23 g of phosphoric acid (H3PO4 85%) to a 1.5 litre double jacketed reactor vessel connected to an oil bath and equipped with a stirrer. The mixture was heated under a nitrogen blanket to 50° C. to dry the PEG, followed by the addition of 177 g of isophorone diisocyanate (IPDI) and 0.31 g of dibutyl tin dilaurate (DBTL). An exotherm was observed where the temperature of the bulk raised to 90° C., after which the temperature was held at 65° C. After one hour, isocyanate content was 0.83 meq g$^{-1}$, determined by potentiometric titration according to ISO 14896-Plastics—Polyurethane raw materials—Determination of isocyanate content. The temperature was set at 70° C. and a mixture of 263 g of polyethyleneglycol acrylate (Bisomer PEA 6) and 0.31 g of DBTL were added to the reactor within 40 min under an air flux. The temperature was maintained at 80° C. until the isocyanate content was lower than 0.02 meq g$^{-1}$, after which the reaction was terminated.

Characterization of MC283: Proton Nuclear Magnetic Resonance ($^1$H-NMR)

Figure 2:
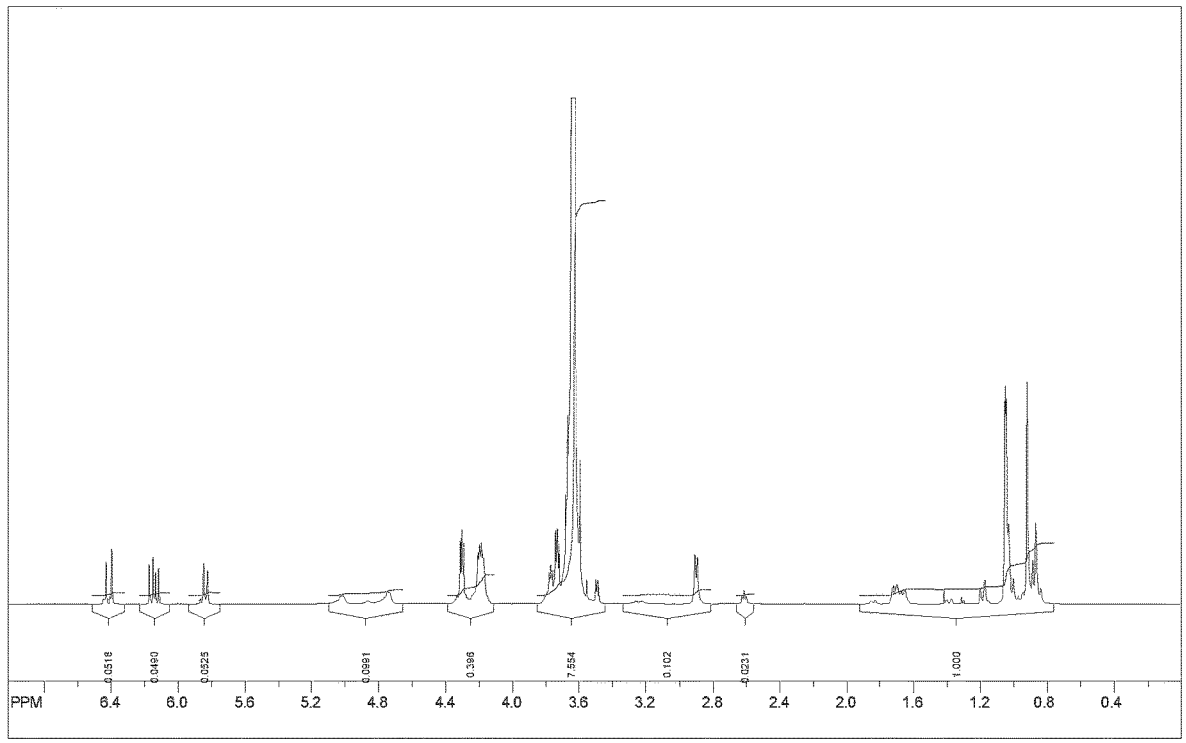
FIG. 2: Proton Nuclear Magnetic Resonance spectrum ($^1$H-NMR) of MC283. Deuterated chloroform was used as solvent and acted as reference signal.

The product was dissolved in deuterated chloroform (CDCl$_{13}$), and $^1$H-NMR spectra were recorded on a Bruker "Avance 500" spectrometer. A total of 16 scans were recorded, with an acquisition time of 3.17 seconds. The solvent signal was used as reference signal. The $^1$H-NMR spectrum is provided in FIG. 2. The signals from 0.85 to 1.9 pm correspond to the methyl and cyclic methylene groups of IPDI. Further signals from IPDI are observed at 2.9 and 3.25 pm. Protons of the PEG-methyl adjacent to the urethane are at 4.2 pm, while the PEG-methyl protons next to the acrylate group are detected at 4.3 pm. The signal from the urethane protons are observed between 4.7 and 5.1 pm. The signals at 5.85, 6.15 and 6.4 pm correspond to the acrylate protons. A Michael-type addition reaction can occur as a minor side reaction between the hydroxyl groups of unreacted PEG and the acrylates of MC283. This is evidenced by the signal at 2.6 pm.

Characterization of MC283: Gel permeation chromatography The number average molecular weight (Mn), the weight average molecular weight (Mw) and polydispersity (D) of MC283 were determined by conventional gel permeation chromatography (GPC) with Polystyrene standards EasyCal from Polymer Laboratories (Molecular Weight range: 200-400.000 g/mol). The sample was dissolved (1.0% wt./wt.) in tetrahydrofuran (THF) containing 0.5% toluene as Flow rate marker. Analysis are performed by liquid chromatography (Merck-Hitachi L7100) equipped with 3 PLGel Mixed-D LS polystyrene divinylbenzene GPC columns (300×7.5 mm×5 µm). The components of the sample were separated by the GPC columns based on their molecular size in solution and detected by a Refractive Index detector. Data were gathered and processed by Polymer Laboratories Cirrus GPC software.

Figure 3:
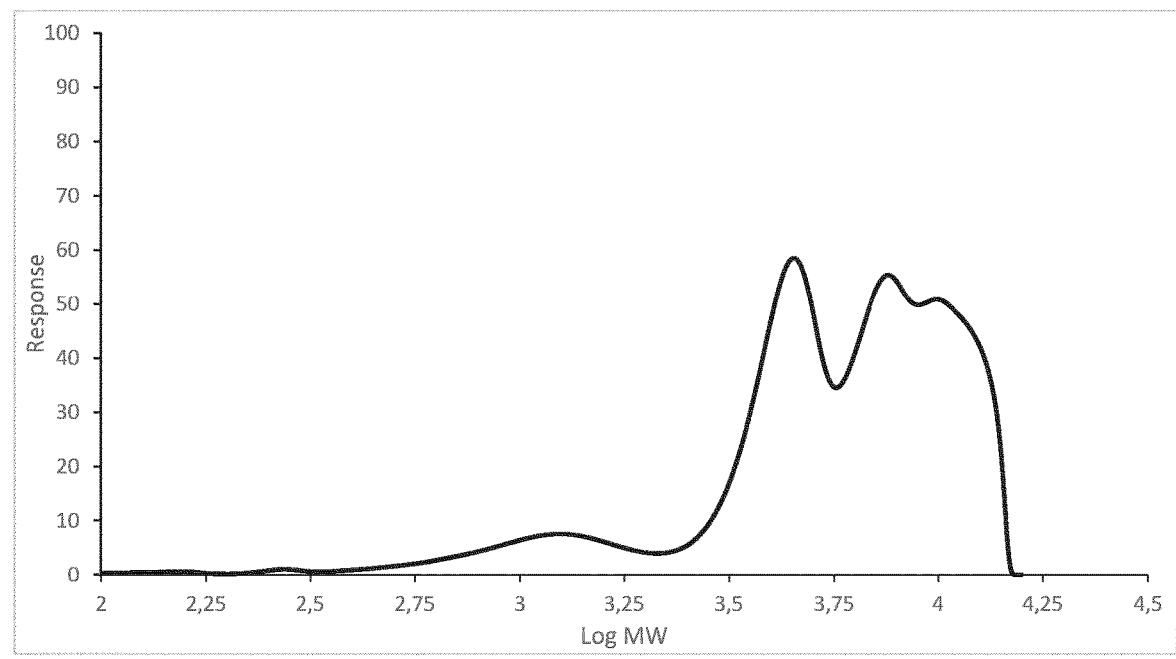
FIG. 3: GPC chromatogram of MC283.

Based on the GPC chromatogram in FIG. 3, the number-average molecular weight was calculated as 3800 g/mol, and the weight average molecular weight was 7580 g/mol. The polydispersity was 1.98. The small signals at 2.23 and 2.45 correspond to unreacted IPDI and Bisomer PEA6, respectively. The peak at 3.1 corresponds to the reaction product of IPDI with Bisomer PEA 6, which is a side reaction yielding low molecular weight products. The peaks at 3.67, 3.89 and 4.00 correspond to the desired reaction products; higher molecular weights indicate a higher number of repetitions of the PEG 2000 backbone, indicated by Z in FIG. 1. Here, Z varies between 1 and 3, while a small fraction with Z>3 can be observed in the tail of the last peak of the chromatogram.

Characterization of MC283: Infrared Spectroscopy

Figure 4:
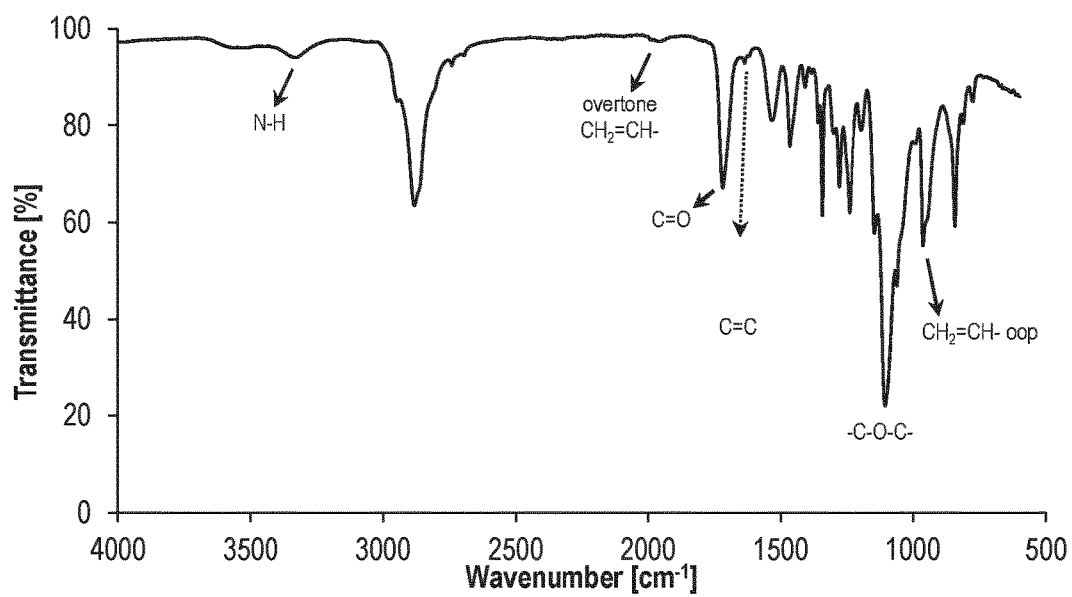
FIG. 4: ATR-FTIR spectrum of MC283.

ATR FT-IR spectroscopy is a frequently used technique in the structure analysis of chemical compounds. Its main advantage is that it enables the analysis of solid samples. Spectra were recorded on a Perkin Elmer Frontier FT-IR in ATR mode. Each spectrum is the result of 8 scans. A diamond crystal with ZnSe lenses was used, with a refractive index of 2.4 at 1000 $cm^{-1}$. The resulting spectrum is indicated in FIG. 4, while a detailed assignment of the infrared resonances is provided in Table 1.

TABLE 1

Assignment of infrared resonances of MC283

| Wavenumber [$cm^{-1}$] | Intensity | Assignment |
|---|---|---|
| 3331 | medium | urethane N—H stretch (broad) |
| 1959 | weak | overtone $CH_2$=CH— oop vibration |
| 1718 | strong | urethane C=O stretch |
| 1640 | weak | acrylate C=C stretch |
| 1636 | weak | acrylate C=C stretch |
| 1100 | strong | assymetrical C—O—C stretch |
| 965 | strong | $CH_2$=CH— oop vibration |

Characterization of MC283: Differential Scanning calorimetry

Whether a material was crystalline or partially crystalline could be verified by conventional DSC. The thermograms were recorded using a Mettler DSC823e instrument after suitable calibration with indium. Standard aluminum crucibles of 20 µL were used and the sample mass was typically between 3 and 4 mg. Dry nitrogen was used as flow gas (flow rate of 50 mL min-1). First, to anneal the material, the sample was heated a rate of 10° C. min-1 to 60° C. Next, the sample was cooled to −20° C. at a rate of −5° C./min-1. In the cooling run, crystallization events are established from crystallization exotherms. Finally upon heating a second time to 70° C. at a rate of 10° C. min-1 the presence of (partially) crystallized domains could further be confirmed from endothermic melting peaks in the thermograms.

Example 2: Synthesis of AH6

Synthesis

Poly(ethylene glycol) with MW 2000 g/mol was obtained from Merck. Butylhydroxytoluene was obtained from Innochem GMBH. Isophorone diisocyanate was obtained from BASF or from Evonik. Tone M100 was obtained from DOW. Dibutyl tin dilaurate was obtained from Perstorp Chemicals GMBH.

Figure 5:
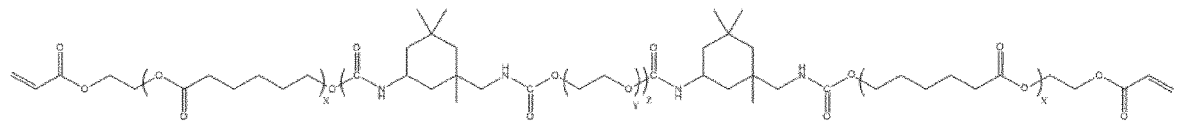
FIG. 5: Acrylate end-capped, urethane based hydrogel precursor (AH6), with X=2, Y=45 and Z=1 to 3. X, Y and Z are average values.

The urethane acrylate hydrogel precursor, indicated in FIG. 5, were prepared by adding 65 g of poly(ethylene glycol) (PEG) with MW 2000 g/mol, 0.05 g of butylhydroxytoluene (BHT) and 0.023 g of phosphoric acid ($H_3PO_4$ 85%) to a 0.15 litre double vessel connected to an oil bath and equipped with a stirrer. The mixture was heated under a nitrogen blanket to 50° C. to dry the PEG, followed by the addition of 14.4 g of isophorone diisocyanate (IPDI) and 0.025 g of dibutyl tin dilaurate (DBTL). After three hours, isocyanate content was 3.26%, determined by potentiometric titration according to the ISO 14896 norm. The temperature was set at 85° C. and a mixture of 22.4 g of poly(caprolactone) acrylate (Tone M100) and 0.025 g of DBTL were added to the vessel. The temperature was maintained at 80° C. until the isocyanate content was 0.1%, after which the reaction was terminated.

Characterization of AH6: Gel Permeation Chromatography

The number-average molecular weight (Mn), the weight-average molecular weight (Mw) and polydispersity (D) of MC283 were determined by conventional gel permeation chromatography (GPC) with Polystyrene standards EasyCal from Polymer Laboratories (Molecular Weight range: 200-400.000 g/mol). The sample was dissolved (1.0% wt./wt.) in tetrahydrofuran (THF) containing 0.5% toluene as Flow rate marker. Analysis are performed by liquid chromatography (Merck-Hitachi L7100) equipped with 3 PLGel Mixed-D LS polystyrene divinylbenzene GPC columns (300×7.5 mm×5 µm). The components of the sample were separated by the GPC columns based on their molecular size in solution and detected by a Refractive Index detector. Data were gathered and processed by Polymer Laboratories Cirrus GPC software.

Figure 6:
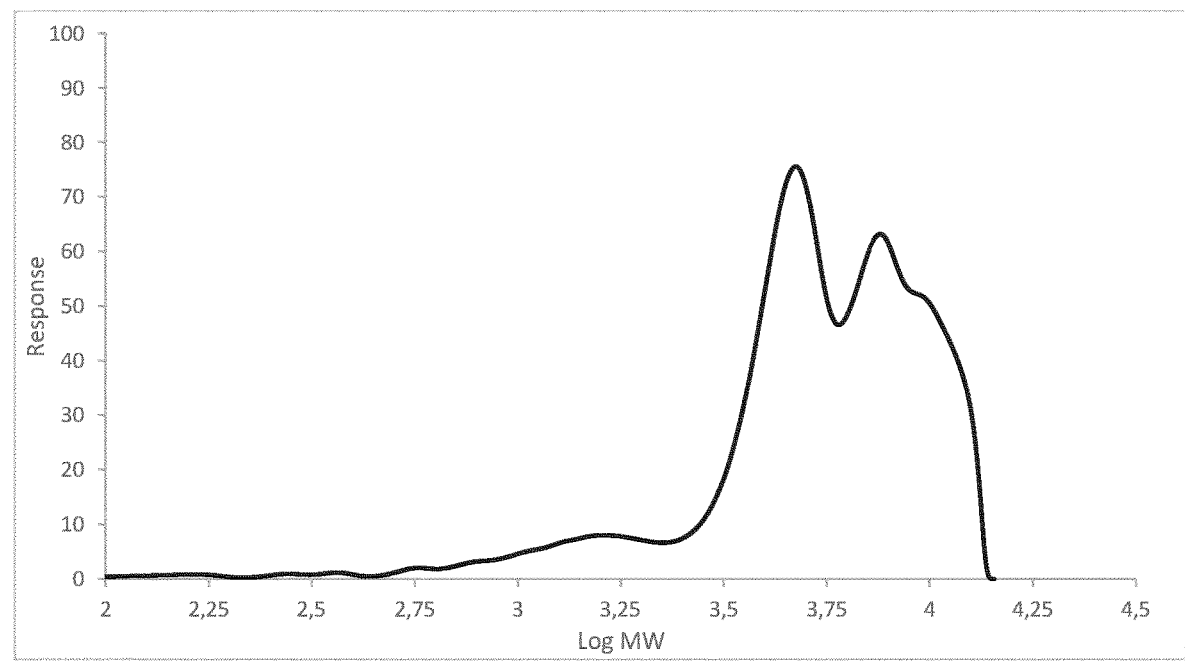
FIG. 6: GPC chromatogram of AH6.

Based on the GPC chromatogram in FIG. 6 of AH6, the number-average molecular weight was calculated as 3780 g/mol, and the weight average molecular weight was 6200 g/mol. The polydispersity was 1.64. The peak at 3.2 corresponds to the reaction product of IPDI with Tone M100, which is a side reaction yielding low molecular weight products. The peaks at 3.69, 3.89 and 4.00 correspond to the desired reaction products; higher molecular weights indicate a higher number of repetitions of the PEG 2000 backbone, indicated by Z in FIG. 1. Here, Z varies between 1 and 3, while a small fraction with Z>3 can be observed in the tail of the last peak of the chromatogram.

Example 3: Processing of MC283 into a Hydrogel Film, with Varying Amounts of Water Hydrogels with water content varying from 10 wt/wt % to 90 wt/wt % were prepared using 0.2 w/w % of Additol CPK as photo-initiator relative to the precursor content. The prepolymer was heated above the melting temperature, after which the photo-initiator was mixed in the molten resin. After mixing of the photo-initiator, the appropriate amount of water was added to the resin. Deionized (milliQ) distilled water was used throughout this work. All hydrogels were prepared using the same exposure conditions to UV light, i.e. irradiation for 20 min with a light intensity of 1.5 mW cm$^{-2}$ using Philips TLD36W/08 UV-lamps. The aqueous resin solutions were always protected with a PET film from the topside to prevent loss of water during polymerization.

Figure 7:
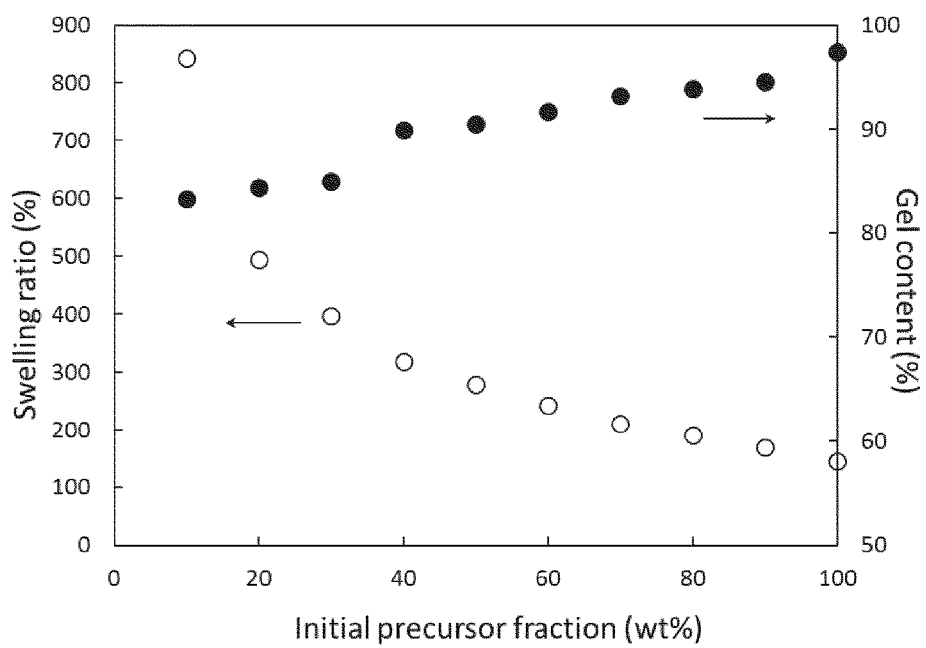
FIG. 7: Swelling ratio and gel content for cross-linked samples of MC283 with varying water content.

Characterisation of the Cross-Linked Hydrogels by Determination of Swelling Degree and Gel Fraction Swelling experiments were conducted using cross-linked hydrogel samples with a thickness of at least 1 mm. The samples were prepared in aluminum dishes with a diameter of 7 cm resulting in an initial sample mass of approximately 4 to 5 g. After crosslinking, the samples were dried to remove all water and determine the dry weight before swelling. The samples were soaked into water for at least seven days until equilibrium swelling was achieved. After weighing the equilibrium swollen samples, they were dried and weighed again. The swelling ratio (in %) relative to the dry resin was determined gravimetrically and reads as $(m_s/m_{p,\ after\ swelling}-1)*100\%$ where $m_s$ in the mass of the swollen sample at equilibrium and $m_p$ is the mass of the dry sample after swelling. The gel content (in %) was calculated as $m_{p,\ after\ swelling}/m_p*100\%$ where $m_p$ is the dry sample before swelling. The results for the different water concentrations are indicated in FIG. 7.

Example 4: Processing of MC283 into a Hydrogel Film, in the Solid State Without Adding a Photo-Initiator The PU precursor is heated in the oven at 55° C. until completely molten. The melt is then poured into a 1 mm silicon spacer, attached to a glass plate. To remove bubbles and allow the solution to spread evenly, the glass plate is placed in the oven (55° C.) for 10 min before a second glass plate is placed on top. The glass plates are left for at least 1 hour to let the solution cool slowly at room temperature. Then the glass plates with the precursor solution are placed inside an incubator at 21° C. for 1 hour to equilibrate. The UVA light is then turned on for 20 min at 21° C. to crosslink the samples. UV irradiation occurred by means of a LWUV-lamp model VL-400L (Vilber Lourmat, Marne La Vallée, France), with an intensity of 8 mW/cm2 and a wavelength range of 250-450 nm Characterisation of the Crosslinked Hydrogels by Determination of Swelling Degree and Gel Fraction After crosslinking, the dry weight before swelling was determined gravimetrically. The samples were soaked into water until equilibrium swelling was achieved. After weighing the equilibrium swollen samples, they were dried and weighed again. Calculation of swelling ratio and gel fraction were performed as explained in example 3. The swelling ratio relative to the dry resin was determined gravimetrically as 137.99% with a standard deviation of 0.78%, while the gel fraction was 97.79% with a standard deviation of 0.28%.

Example 5: Production of Electrospun Fibres from MC283

Electrospinning provides a method for generating nonwoven, three-dimensional, porous fibre-based matrices. The basic set-up consists of three components including a high voltage power supply, a metallic needle and a grounded collector plate. A syringe containing the polymer melt or solution is connected to the metal needle and the flow rate of the feed is controlled by a syringe pump. Application of a high voltage (1 to 30 kV) results in an electrified, pendant drop at the tip of the needle. Eventually, the electrostatic repulsion overcomes the surface tension of the polymer solution and a liquid jet is ejected. The electrified jet undergoes stretching and the solvent evaporates during "time of flight" towards the collector. Micro- to nanometer scale fibres are deposited randomly onto the grounded collector plate.

Photo-initiator Irgacure 2959 was dissolved in EtOH (Irgacure stock solution of 0.02 g/mL) and poly(ethylene oxide) with a molecular weight of $10^6$ g/mol was dissolved in Milli-Q water (PEO stock solution of 0.1 g/mL). To obtain the electrospinning solution, 2.25 g of MC283 was dissolved in 1 g of the PEO stock solution, and 0.43 mL of Milli-Q water, 0.43 g of ethanol and 1.59 g of the Irgacure stock solution where added. A total concentration of 45 wt % for MC283 and 2 wt % for PEO was obtained in a 50/50 mixture (in weight) of ethanol and water. The homogenized viscous solution was poured in a syringe with internal diameter of 21 mm. A tubing with needle was attached at the end of the syringe. The syringe was mounted in the pump device and flow rate was set to 1.5 mL/h. The distance between the tip of the needle and the collector plate was set at 15 cm, and the voltage difference was set to 15 kV. Fibres where collected on a glass plate. Samples were transferred in a plastic bag with zip and were flushed with $N_2$ for 10 min creating an inert atmosphere. Next, the plastic bag was illuminated with UV light for 40 min. UV irradiation occurred by means of a LWUV-lamp model VL-400L (Vilber Lourmat, Marne La Vallée, France), with an intensity of 8 mW/cm2 and a wavelength range of 250-450 nm.

Characterization of the Electrospun Fibres Using Optical Microscopy

With an optical microscope, a magnification of the sample is obtained using visible light and a series of lenses to allow different magnifications. The sample can either be illuminated from below or above, with the latter enabling the analysis of non-transparent samples. Optical microscopy evaluation of the samples occurred by means of an Axiotech 100 Reflected Light Microscope (Carl Zeiss), with reflected-light brightfield for Köhler Illumination.

Figure 8:
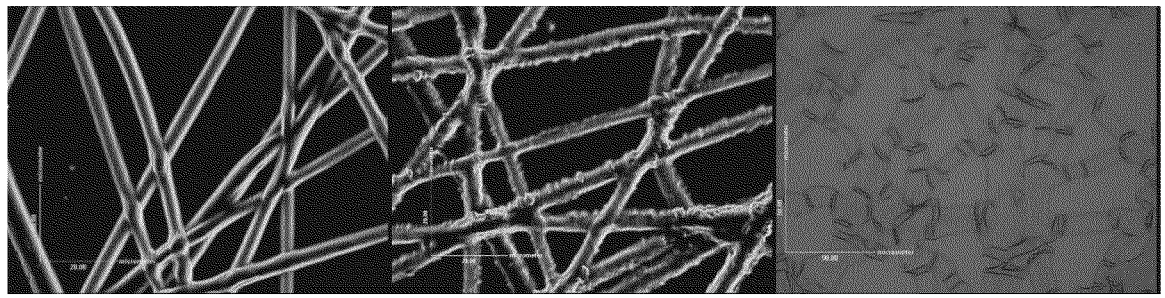
FIG. 8: Electrospun fibres before curing (left) after curing (middle) and after 10 minutes of swelling in water (right), all obtained at a magnification of 100×.

In FIG. 8, the electrospun fibres are depicted. The left image is of the fibres before the crosslinking process. The middle image was obtained after crosslinking, and shrinkage of the fibre edges due to the crosslinking process can be observed. The right image shows the fibres after 10 minutes swelling in Milli-Q water. This proves the effectiveness of crosslinking: fibres that were not cross-linked dissolved immediately in water.

Example 6: 3D Scaffolds Based on Templates

Figure 9:
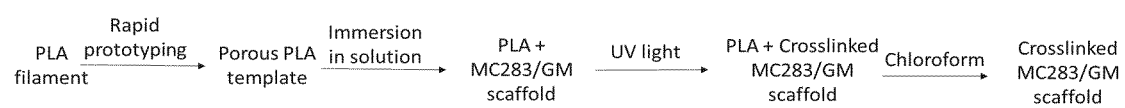
FIG. 9: Template based design of 3D Scaffolds. GM stands for gelatine methacrylamide.

Porous cubic PLA templates (10 mm×10 mm×10 mm) were fabricated using an Ultimaker 1 instrument with nozzle diameter of 400 μm. The PLA filament was provided by Velleman. PLA templates were immersed under vacuum and at 35° C. in an aqueous solution containing 90 wt % of MC283 and 1 wt % of gelatine modified with methacrylamide functional groups (GM). Next, the immersed PLA templates were illuminated with UV light for 1 hour. Selective leaching of the PLA was then performed for 2 weeks in chloroform to obtain the final hydrogel 3D scaffold. This strategy is illustrated in FIG. 9.

Figure 10:
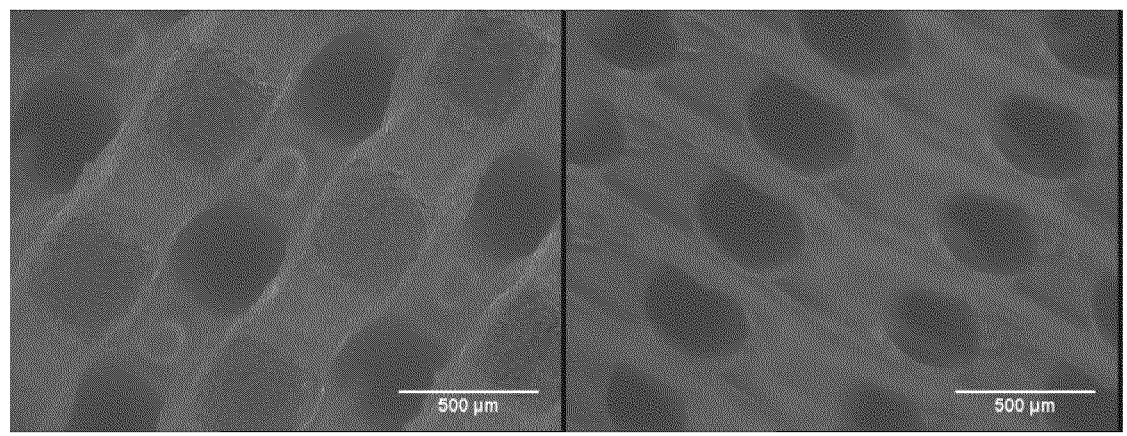
FIG. 10: Top view (left) and side view (right) of the porous, 3D scaffolds, magnification 5×.

Characterization of the 3D Scaffolds Using Optical Microscopy (FIG. 10)

With an optical microscope, a magnification of the sample is obtained using visible light and a series of lenses to allow different magnifications. The sample can either be illuminated from below or above, with the latter enabling the analysis of non-transparent samples. Optical microscopy evaluation of the samples occurred by means of a Axiotech 100 Reflected Light Microscope (Carl Zeiss), with reflected-light bright field for Köhler Illumination. The average pore size based on the top view images was calculated as 350±26 µm, while the average porosity from the side was 250±17 µm.

Example 7: Determination of Reactivity Ratio $r_p$ by Differential Photocalorimetry (DPC)

Urethane-based precursors with varying molecular structures were synthesized to test the hypothesis that the reactivity of the (meth)acrylates in the solid state was influenced by the molecular flexibility of the end groups. The different precursors are depicted in FIG. 11, and the building blocks are indicated in Table 2.

The photoreactivity of the urethane precursors was determined by differential photocalorimetry (DPC). Isothermal DPC experiments were conducted using a Mettler DSC 823e equipped with a Hamamatsu Lightningcure™ LC8 (L9588) unit. The light source was a medium-pressure mercury-xenon lamp with prominent emission lines at 298, 302, 313, 365, 405 and 435 nm. The irradiance level in the UV-A range was adjusted to 15 mW cm-2 at the position of the sample crucible after calibration with a UVA-power meter (Hamamatsu C6080-03). Light aluminum crucibles (20 µL) were used for the experiments. The sample mass was typically 3 to 4 mg. An open empty aluminum crucible was placed at the reference location and the DSC cell was closed with an UV-transparent quartz cover. Dry nitrogen was used as flow gas (flow rate of 50 mL min-1). In order to compensate for the heat flow generated by the light source, reference and sample sides of the DSC cell were illuminated simultaneously. However, imperfect balance still led to a differential in evolved heat. Hence, in order to obtain the net reaction exotherm photopolymerization experiments were run in a sequence of two exposure steps where the actual photopolymerization is completed in the first step and the underlying background heat flow is determined during the second one. Subtraction of the two heat flow signals then results in the net heat flow which is proportional to the polymerization rate. In the present experiments, UV-exposure was maintained for 4 min in the respective steps. The net heat flow signal is typically a peaked curve as a function of time. At a particular temperature T, the reactivity can be assessed from the maximum value of the heat flow, $h_{maxT}$, which is proportional to the maximum polymerization rate.

Photopolymerizations were conducted in isothermal conditions at 20° C. and 50° C. Prior to irradiation, the sample was annealed at 60° C. for 1 min, then cooled at a rate of −5° C. min-1 to the test temperature and held at this temperature for 10 min before starting the UV-exposure cycles. The ratio between the maximum heat flow values at 20° C. and 50° C. is expressed as $$r_p = \frac{h_{max,20}}{h_{max,50}},$$

and provides a measure of the relative photoreactivity. When $r_p$>1, the maximum polymerization rate is higher at 20° C. than at 50° C. This was quite unexpected as polymerization usually accelerates upon temperature increase.

To investigate the influence of the molecular structure on the reactivity in solid (20° C.) and molten (50° C.) state, a range of polymers were synthesized as indicated in Table 2 and FIG. 11.

TABLE 2

Different urethane precursors, their building blocks and $r_p$ values

| Name | Backbone | Diisocyanate | End group | Average number of units | Spacer | $r_p$ |
|---|---|---|---|---|---|---|
| Embodiments of the invention | | | | | | |
| MC283 | PEG 2000 | IPDI | Bisomer PEA 6 | 6 | ethylene oxide units | 2.49 |
| AH2 | PEG 2000 | IPDI | Bisomer PEM 6 | 6 | ethylene oxide units | 1.42 |
| AH6 | PEG 2000 | IPDI | Tone M100 | 2 | Caprolactone units | 1.60 |
| AH8 | CAPA 2200 | IDPI | Bisomer PEA 6 | 6 | ethylene oxide units | 1.88 |
| Comparative examples | | | | | | |
| AH5 | PEG 2000 | IPDI | Bisomer PPA 6 | 6 | propylene oxide units | 0.76 |
| AH1 | PEG 2000 | IPDI | HEA | 1 | ethylene oxide unit | 0.30 |

It was hypothesised that the unexpectedly higher reactivity of the urethane precursors in the solid state was caused by the molecular flexibility of the end group. To test this hypothesis, the reactivity of urethane precursors with a flexible ethylene oxide end group spacer (MC283) was compared to the reactivity of a precursor without spacer (AH1). After calculating $r_p$ for both polymers, it is clear that AH1, without a spacer, is much less reactive in the solid state compared to the molten state, as evidenced by:

$r_p$=0.30<1 while MC283 is more reactive in the solid state:

$r_p$=2.49>1

To further investigate the influence of molecular flexibility on the reactivity, two more compounds were synthesized. AH6 has a caprolactone spacer, which is expected to have a similar flexibility compared to the ethylene oxide spacer, while AH5 will be less flexible with a propylene oxide spacer. The obtained $r_p$ values for both polymers further substantiated the hypothesis: AH5 has a $r_p$ value of 0.76 indicating a lower reactivity in the solid state, while AH6 maintains a higher reactivity in the solid state, evidenced by $r_p$ value of 1.6.

Finally, two more polymers where synthesized, to test if this increase in reactivity could be transferred to other polymer types and reactive groups. A polymer with poly(caprolactone) in the backbone and an ethylene oxide spacer, AH8, had a $r_p$ value of 1.8. A polymer with methacrylate reactive groups, a poly(ethylene oxide) backbone, and ethylene oxide spacer had a $r_p$ value of 1.42.

In conclusion, it was shown that by incorporating a flexible molecular spacer, increased reactivity in the solid state was obtained. This was evidenced for different flexible spacer compounds, such as ethylene oxide and caprolactone, and could be transferred to different polymer types (poly(ethylene oxide) and poly (caprolactone) in the polymer backbone). In addition, this increased reactivity was observed for both acrylate and methacrylate molecules. As comparative examples, a precursor without end group spacer (AH1) and a precursor with a rigid propylene oxide spacer (AH5) were shown to be less reactive in the solid state.

Example 8: Direct Printing of 3D Scaffolds 3D hydrogel scaffolds were obtained from MC283 via fused deposition modelling (FDM) using the Bioscaffolder™ system (System-Engineering, Hünxe, Germany) equipped with a high temperature extrusion head. MC283 was loaded into a metal cartridge and heated up to above its melting point at 45° C. The extrusion of the molten material is driven by a rotating screw, which forces the material to be extruded trough a needle. This system enables the 3D fabrication of scaffolds by moving the dispensing head in X-Y-Z directions, while the material is deposited onto a stationary platform. The platform is equipped with a Peltier element, which enables cooling of the plotting surface (10-15° C.). The MC283 hydrogel precursor was 3D printed in cubic scaffolds (15 mm×15 mm) with a lay down pattern of 0°/90°. The scaffolds were 3D printed by setting a X-Y printing speed ranging from 180 mm/min to 240 mm/min and a Z-direction speed from 500 mm/min to 760 mm/min. Layer height was set at 0.12 mm. The strand distance varied from 0.8-1.2 mm. The obtained scaffolds were subsequently cross-linked via UV curing and their internal morphology was observed with an optical microscope (Axiotech microscope, Zeiss, Oberkochen, Germany).

Example 9: Direct Printing of 3D Scaffolds from Solution

Modification of the rheological properties and thixotropic behavior of a pre-gel solution is possible by combing the hydrogel precursors with clay-based additives. Laponite, an example of a clay based additive, consists of synthetic and charged silicate nanodiscs that are water soluble. Laponite acts as a cross-linker between the polymeric chains, which are absorbed onto the surface of the nanodiscs via physical interactions. Here, Laponite was added to MC283 precursor solutions, and this formulation was successfully 3D printed into a shape of porous cubic scaffolds via the 3D Bioscaffolder™ system. The shear-thinning behavior of the Laponite solution enabled the direct deposition onto the printing platform, while retaining the desired shape.

The method followed for the preparation of the hydrogel-clay hybrid formulations consists of the initial dissolution of Laponite in milli-Q water at room temperature and under stirring. When Laponite was completely dissolved, the MC283 hydrogel precursor powder was added and the mixture was heated at 50° C. under mechanical stirring overnight until a homogeneous solution was obtained. The same protocol was followed for all compositions prepared and characterized in this study. In the compositions prepared for rheological measurements, Laponite RD and Laponite RDS were chosen as additives. Various compositions with a variable Laponite content, ranging from 2 wt % to 5 wt % and a fixed MC283 hydrogel precursor concentration of 30 wt % were prepared.

Rheological Characterization

Figure 12:
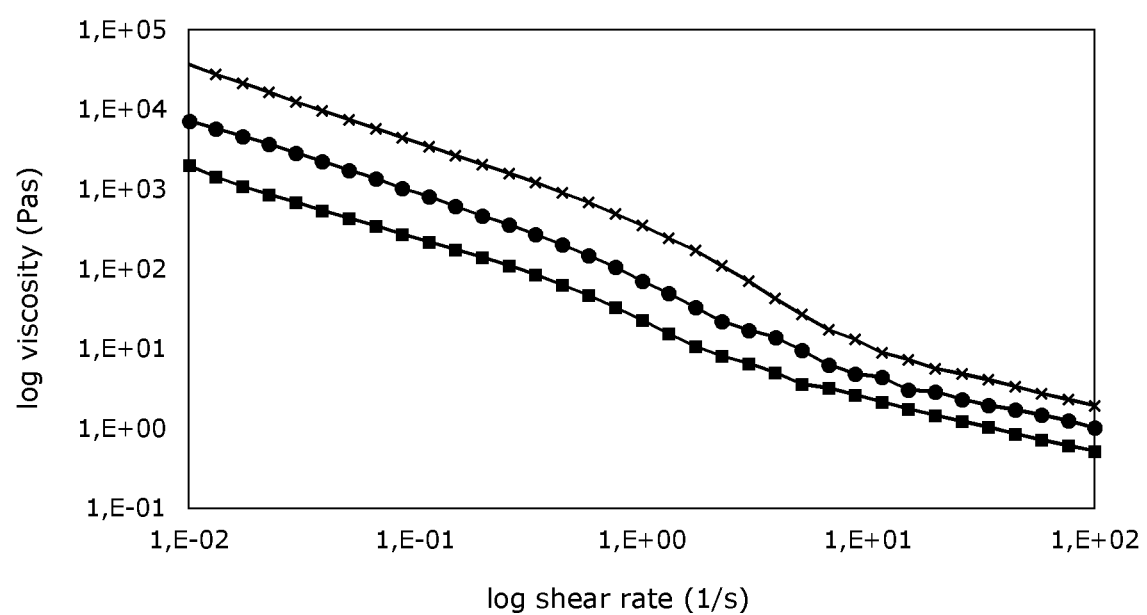
FIG. 12: Graphical presentation of rheological measurements displaying viscosity (Pa·s) versus shear rate (1/s) for MC283 hydrogel (30 wt %) with different amounts of Laponite RD (square: 2 wt %, circle: 3 wt %, cross: 4 wt %).

Rheological characterization of the MC283 hydrogel precursors and Laponite RD solutions was performed using a Physica MCR 350 (Anton Paar) rheometer with a plate-plate geometry. All measurements were performed at room temperature (21° C.), injecting approximately 500 µl of solution between the plates and setting a gap size of 0.5 mm. The effect of Laponite content on the rheological properties of the solutions in the presence of the AUP precursor was investigated and the viscosity as a function of shear rate ($0.01 \div 100$ s$^{-1}$) was measured. As shown in FIG. 12, the desired shear thinning behavior can be clearly observed: With increasing shear rate, the viscosity will decrease for all formulations.

Printing of 3D Scaffolds

Three-dimensional porous scaffolds were produced using the Bioscaffolder™ dispensing system (Sys-Eng, Hümxe, Germany). Briefly, the Bioscaffolder™ is a pneumatic system equipped with a dispensing head operated in three-axis that deposits hydrogel precursor solutions on a stationary surface. The dispensing system consists in a commercially available syringe with a standard Luer-Lock-adaptation for the dispensing needle. The syringe is connected to compressed air and by regulating the applied pressure, deposition of the solution is controlled. A heating-cooling mantle is surrounding the dispensing syringe to guarantee homogeneous control of the printing temperature, which was set at 10° C. The stationary platform is equipped with a Peltier element, which enables heating and cooling of the plotting surface, and was set to 10-15° C. The formulations containing the MC283 hydrogel precursor and Laponite RDS were 3D printed in the shape of cubic porous scaffolds (15×15 mm) with a lay-down pattern of 0/90°. Photo-polymerization of the hydrogel precursor was performed during printing of the scaffolds using UVA LEDs directly connected to the bottom of the dispensing system. In addition, a post-plotting curing step by UVA-light irradiation using a UVA lamp (8 mW/cm$^2$, 45 min) was performed. All compositions were printed using a standard 22-gauge needle with an inner diameter of 400 µm (22G A ½"). A detailed analysis of the scaffolds architecture (regularity of the overall construct, internal porosity and struts thickness), as a function of printing parameters, such as temperature (25-10° C.), printing speed (300-1200 mm/min), applied pressure (5-0.5 bar), layer thickness (0.20-0.30 mm) and strand distance (0.8-1.4 mm), was performed. The morphology of the hydrogel scaffolds was observed using an optical microscope (Axiotech microscope, Zeiss, Oberkochen, Germany) and the internal porosity and struts thickness were measured.

Example 10: Synthesis of AH15

The following description provides a method of manufacturing a (meth)acrylate functional polyurethane prepolymer according to an embodiment of the invention, with $r_p$ larger than 1.

Synthesis

Poly(ethylene glycol) with MW 10000 Da was obtained from Sigma. Butylhydroxytoluene was obtained from Innochem GMBH. Isophorone diisocyanate was obtained from BASF or from Evonik. Bisomer PEA6 was obtained from GEO Specialty Chemicals UK Ltd. Bismuth neodecanoate was supplied from Umicore.

A urethane acrylate hydrogel precursor was prepared by adding 483.1 g of poly(ethylene glycol) (PEG) with MW 10000 Da, 80.6 g of methylethyl ketone (MEK), 0.269 g of butyl hydroxytoluene (BHT) and 0.084 g of phosphoric acid (H$_3$PO$_4$ 85%) to a 1.5 litre double jacketed reactor vessel connected to an oil bath and equipped with a stirrer. The mixture was heated under a nitrogen blanket to 50° C. to dry the PEG, followed by the addition of 21.5 g of isophorone diisocyanate (IPDI) and 0.161 g of bismuth neodecanoate. The temperature was held at 80° C. After one hour, isocyanate content was 0.148 meq g$^{-1}$, determined by potentiometric titration according to ISO 14896. The temperature was set at 70° C. and a mixture of 32.5 g of polyethyleneglycol acrylate (Bisomer PEA 6) and 0.161 g of bismuth neodecanoate were added to the reactor within 40 min under an air flux. The temperature was maintained at 80° C. until the isocyanate content was lower than 0.02 meq MEK was stripped under vacuum after adding 166 g of water. Reaction was terminated and product was filtered. For final removal of water and MEK, products were vacuum-dried overnight at 50° C.

Determination of $r_p$ Value Using Photo-DSC The $r_p$ value was measured as described in example 7, however as the material has a melting point above 50° C., the heat of polymerization was determined at 70° C.:

$$r_p = \frac{h_{max,20}}{h_{max,70}}$$

A value of $r_p=2.12$ was obtained, indicating a higher reactivity in the solid state (20° C.) compared to the molten state (70° C.).

Example 11: Processing of AH15 into a Hydrogel Film, in the Solid State without Adding a Photo-Initiator Processing of AH15 into a hydrogel film was performed as described in Example 4, however, as the melting point of the material is above 55° C., prepolymers were heated in the oven at 85° C. until they are completely molten.

Determination of Swelling Ratio and Gel Fractions

Calculation of swelling ratio and gel fraction was performed as explained in Example 3. The swelling ratio relative to the dry resin was determined gravimetrically as 681.45% with a standard deviation of 17.45%, while the gel fraction was 81.60% with a standard deviation of 1.69%.

What is claimed is:

1. A (meth)acrylate functional urethane prepolymer, having a ratio $r_p=h_{max, solid}/h_{max, molten}$ equal to or larger than 1, wherein $h_{max, solid}$ and $h_{max, molten}$ are the maximum heat flow values of the prepolymer measured by differential photocalorimetry (DPC) at solid state and molten state in nitrogen atmosphere in absence of a photo-initiator and in absence of solvent.

2. The (meth)acrylate functional urethane prepolymer according to claim 1, wherein $h_{max, solid}$ is measured at a temperature of 20° C. and $h_{max\ molten}$ is measured at a temperature above the melting temperature of the prepolymer.

3. The (meth)acrylate functional urethane prepolymer according to claim 1, characterized in that, the ratio $$r_p = \frac{h_{max,20}}{h_{max,50}}$$

is equal to or larger than 1, and wherein $h_{max,\ 20}$ and $h_{max,\ 50}$, are the maximum heat flow values of the prepolymer measured by differential photocalorimetry (DPC) at 20° C. (solid) and 50° C. (molten) in nitrogen atmosphere in absence of a photo-initiator and in absence of solvent.

4. The (meth)acrylate functional urethane prepolymer according to claim 1, having the structure: end group-polyisocyanate-backbone-polyisocyanate-end group.

5. The (meth)acrylate functional urethane prepolymer according to claim 1, wherein the prepolymer is obtainable as the reaction product of:
   (i) a glycol having a number-average molecular weight of from 390 g/mol to 25000 g/mol,
   (ii) an polyisocyanate,
   (iii) a (meth)acrylate functionalized compound comprising at least one group capable of reacting with isocyanate groups, and separated from the (meth)acrylated moiety by a glycol-based spacer.

6. The (meth)acrylate functional urethane prepolymer according to claim 1, wherein the prepolymer is obtainable as the reaction product of:
   (i) a glycol having a number-average molecular weight of from 400 g/mol to 10000 g/mol,
   (ii) an polyisocyanate,
   (iii) a (meth)acrylate functionalized compound comprising at least one group capable of reacting with isocyanate groups, and separated from the (meth)acrylated moiety by a glycol-based spacer.

7. The (meth)acrylate functional urethane prepolymer according to claim 1, wherein the prepolymer is of formula (Ia) or (Ib), x is 1-10, $R_1$ is a glycol-based spacer group, $R_2$ is polyisocyanate derived, and $R_3$ is a backbone providing compound.

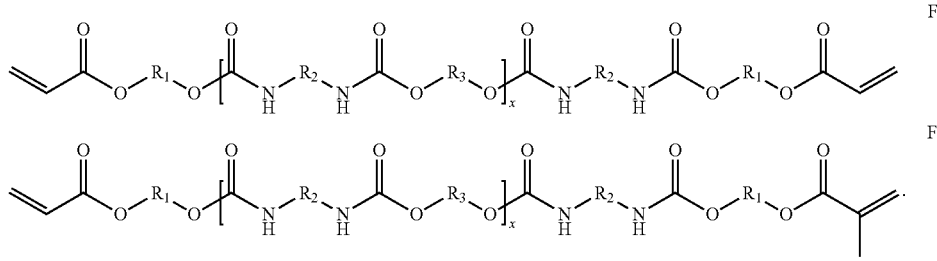

Formula (Ia)

Formula (Ib)

8. The (meth)acrylate functional urethane prepolymer according to claim 1, wherein the (meth)acrylate functional urethane prepolymer is the reaction product of a poly (ethylene glycol), poly(ethylene glycol) mono (meth)acrylate and a polyisocyanate.

9. The (meth)acrylate functional urethane prepolymer according to claim 1, wherein the (meth)acrylate functional urethane prepolymer is the reaction product of a poly (ethylene glycol), caprolactone (meth)acrylate and a polyisocyanate.

10. The (meth)acrylate functional urethane prepolymer according to claim 1, wherein the prepolymer is of formula (II) with n is 45 (PEG 2000), m=6, and x=1-10; n, m and x are average values

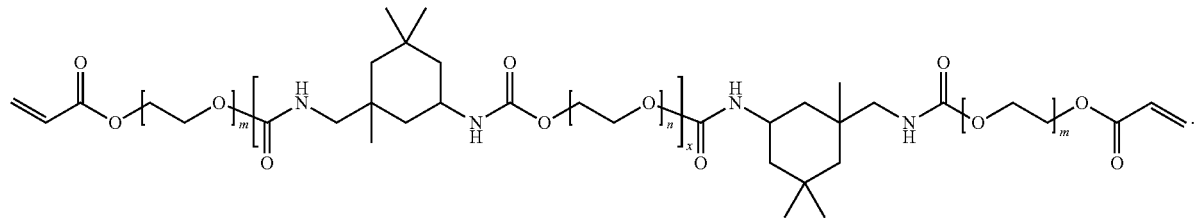

Formula (II)

11. The (meth)acrylate functional urethane prepolymer according to claim 1, wherein the prepolymer is semi-crystalline.

12. A cross-linked material obtainable by curing a (meth)acrylate functional urethane prepolymer according to claim 1.

13. The cross-linked material according to claim 12, wherein the material is solvent swellable.

14. The cross-linked material according to claim 12, wherein the material is water-swellable.

15. The cross-linked material according to claim 12, wherein the material was cured in absence of a photo-initiator.

16. A superabsorbent material, an ocular implant, soft tissue regeneration device, cardiovascular device, wound dressing, orthopaedic implant or tissue engineering scaffold, a thermotropic film, a barrier coating, an antifogging coating, a sound damping control, a thermal barrier material, a microwave protection or detection materials, a fire retardant intumescent coating, a membrane for water purification, encapsulation of seeds, soft-feel coatings, surface wrinkling for mat coating, and/or a strippable coating comprising a cross-linked material according to claim 12.

17. A method for producing a urethane material, comprising: crosslinking by radiation a (meth)acrylate functional urethane precursor according to claim 1, optionally in the presence of a photo-initiator.

18. The method according to claim 17, wherein the precursor is in solid form.

19. The method according to claim 17, wherein the material is a water-swellable electrospun fibre material obtained from
 (i) electrospinning a solution of a water-soluble prepolymer into an inert gaseous medium to form fibre, and thereafter
 (ii) cross-linking the fibre to a degree sufficient that the cross-linked fibre is water-insoluble.

20. The method according to claim 19, wherein the cross-linking is in absence of a photo-initiator and/or in absence of a solvent.

* * * * *